United States Patent
Watanabe et al.

(10) Patent No.: US 11,643,074 B2
(45) Date of Patent: May 9, 2023

(54) AUTONOMOUS DRIVING ASSISTANCE DEVICE

(71) Applicant: DENSO CORPORATION, Kariya (JP)

(72) Inventors: Hideki Watanabe, Kariya (JP); Ichiro Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 454 days.

(21) Appl. No.: 16/892,042

(22) Filed: Jun. 3, 2020

(65) Prior Publication Data

US 2020/0290606 A1 Sep. 17, 2020

Related U.S. Application Data

(63) Continuation of application No. PCT/JP2018/042682, filed on Nov. 19, 2018.

(30) Foreign Application Priority Data

Dec. 15, 2017 (JP) .............................. JP2017-240641

(51) Int. Cl.

| | | |
|---|---|---|
| *B60W 30/09* | (2012.01) | |
| *B60K 35/00* | (2006.01) | |
| *B60W 30/095* | (2012.01) | |
| *B60W 50/14* | (2020.01) | |
| *G05D 1/02* | (2020.01) | |
| *G08G 1/16* | (2006.01) | |

(52) U.S. Cl.
CPC ............ *B60W 30/09* (2013.01); *B60K 35/00* (2013.01); *B60W 30/0956* (2013.01); *B60W 50/14* (2013.01); *G05D 1/0231* (2013.01); *G08G 1/16* (2013.01); *B60K 2370/1438* (2019.05); *B60K 2370/176* (2019.05); *B60W 2420/42* (2013.01); *B60W 2554/40* (2020.02); *G05D 2201/0213* (2013.01)

(58) Field of Classification Search
None
See application file for complete search history.

(56) References Cited

U.S. PATENT DOCUMENTS

2017/0028850 A1* 2/2017 Miller .................... B60K 35/00
2018/0241970 A1 8/2018 Nakai

FOREIGN PATENT DOCUMENTS

| JP | 2003200754 A | 7/2003 |
|---|---|---|
| JP | 2007156755 A | 6/2007 |
| JP | 2007283910 A | 11/2007 |
| JP | 4702100 B2 | 6/2011 |
| JP | 4935694 B2 | 5/2012 |

(Continued)

*Primary Examiner* — Navid Z. Mehdizadeh
(74) *Attorney, Agent, or Firm* — Harness, Dickey & Pierce, P.L.C.

(57) ABSTRACT

A hazard prediction and a hazard avoidance procedure are performed based on a predetermined hazard avoidance condition during an autonomous driving operation of a vehicle. User-input information about a driving operation of the vehicle; is received, and area or object information is checked to determine the area or the object as a monitoring target. The monitoring target is tracked. At least one additional hazard avoidance procedure for the monitoring target is set, and the at least one additional hazard avoidance procedure is performed in addition to the hazard avoidance procedure when the monitoring target approaches the vehicle.

18 Claims, 27 Drawing Sheets

(56) References Cited

FOREIGN PATENT DOCUMENTS

| JP | 2016143308 A | 8/2016 |
| JP | 2017055181 A | 3/2017 |
| JP | 2017119508 A | 7/2017 |
| JP | 2017187982 A | 10/2017 |

* cited by examiner (1ST CASE)

(1ST CASE)

DETAILED MONITOR PROCESS FOR MONITOR AREAS/OBJECTS (2ND CASE)

(2ND CASE)

DETAILED MONITOR PROCESS FOR MONITOR AREAS/OBJECTS (3RD CASE)

(3RD CASE)

(4TH CASE)

AUTONOMOUS DRIVING ASSISTANCE DEVICE

CROSS REFERENCE TO RELATED APPLICATION

The present application is a continuation application of International Patent Application No. PCT/JP2018-042682 filed on Nov. 19, 2018, which designated the U.S. and claims the benefit of priority from Japanese Patent Application No. 2017-240641 filed on Dec. 15, 2017. The entire disclosures of all of the above applications are incorporated herein by reference.

TECHNICAL FIELD

The present disclosure relates to an autonomous driving assistance device.

BACKGROUND

An automatically operated vehicle has the function to detect and automatically avoid a hazard while monitoring surroundings and travels under automatic operation control. Practically, a driver need not concern the driving. In this case, the driver may rely on the automatic operation and blunt the consciousness of recognizing operation states to decrease attention to the driving, pay attention to activities other than driving, or fall asleep. It is anticipated to miss a chance to detect an emergency situation and hardly avoid the emergency situation.

To solve the situation where a driver decreases attention to the driving, there is a technology that determines drowsiness from image data of the driver's face and warns the driver to help the driver to awake. There is another technology that predetermines a place likely to cause drowsiness and, when that place is approaching, uses an air conditioner to avoid the drowsiness. However, it is anticipated that the attentiveness to the driving is too decreased to take a quick response to the emergency depending on levels of drowsiness.

SUMMARY

According to an example embodiment, a hazard prediction and a hazard avoidance procedure are performed based on a predetermined hazard avoidance condition during an autonomous driving operation of a vehicle. User-input information about a driving operation of the vehicle; is received, and area or object information is checked to determine the area or the object as a monitoring target. The monitoring target is tracked. At least one additional hazard avoidance procedure for the monitoring target is set, and the at least one additional hazard avoidance procedure is performed in addition to the hazard avoidance procedure when the monitoring target approaches the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An autonomous driving assistance device is provided such that the device can prevent a driver from decreasing the attentiveness to driving even during automatic operation and can enhance the capability of an automatic operation system to predict hazards.

According to an example embodiment, an autonomous driving assistance device includes: a normal avoidance processing portion that performs a hazard prediction based on a predetermined hazard avoidance condition and performs a hazard avoidance procedure during an autonomous driving operation of a vehicle; an information input portion that receives user-input information about a driving operation of the vehicle; a determination portion that checks area or object information input from the information input portion and determines the area or the object as a monitoring target; a track portion that tracks the monitoring target; and an additional avoidance processing portion that sets at least one additional hazard avoidance procedure for the monitoring target, and performs the at least one additional hazard avoidance procedure in addition to the hazard avoidance procedure performed by the normal avoidance processing portion when the monitoring target tracked by the track portion approaches the vehicle.

When the user is on a subject vehicle, the above-described autonomous driving assistance device allows the normal avoidance processing portion to predict a hazard based on a predetermined hazard avoidance condition during automatic operation and provide a hazard avoidance remedy (i.e., a hazard avoidance procedure). Besides, the onboard user can input information about the operations of the subject vehicle by using the information input portion. The determination portion then identifies the input information about an area or an object as a surveillance target, i.e., a monitoring target. The trail portion trails, i.e., the tracking portion tracks the surveillance target. The additional avoidance processing portion sets an additional hazard avoidance remedy (i.e., an additional hazard avoidance procedure) corresponding to the surveillance target. When the surveillance target trailed by the trail portion approaches the subject vehicle, the additional avoidance processing portion provides an additional hazard avoidance remedy besides the hazard avoidance remedy provided by the normal avoidance processing portion.

While onboard, the user of the subject vehicle such as a driver or a passenger can avoid completely relying on the automatic operation of the subject vehicle, provide supplementary information to the automatic operation based on attentions to surroundings of the subject vehicle, and further improve the safety of the automatic operation.

The description below explains an embodiment of the present disclosure with reference to FIGS. 1 through 36.

Figure 1:
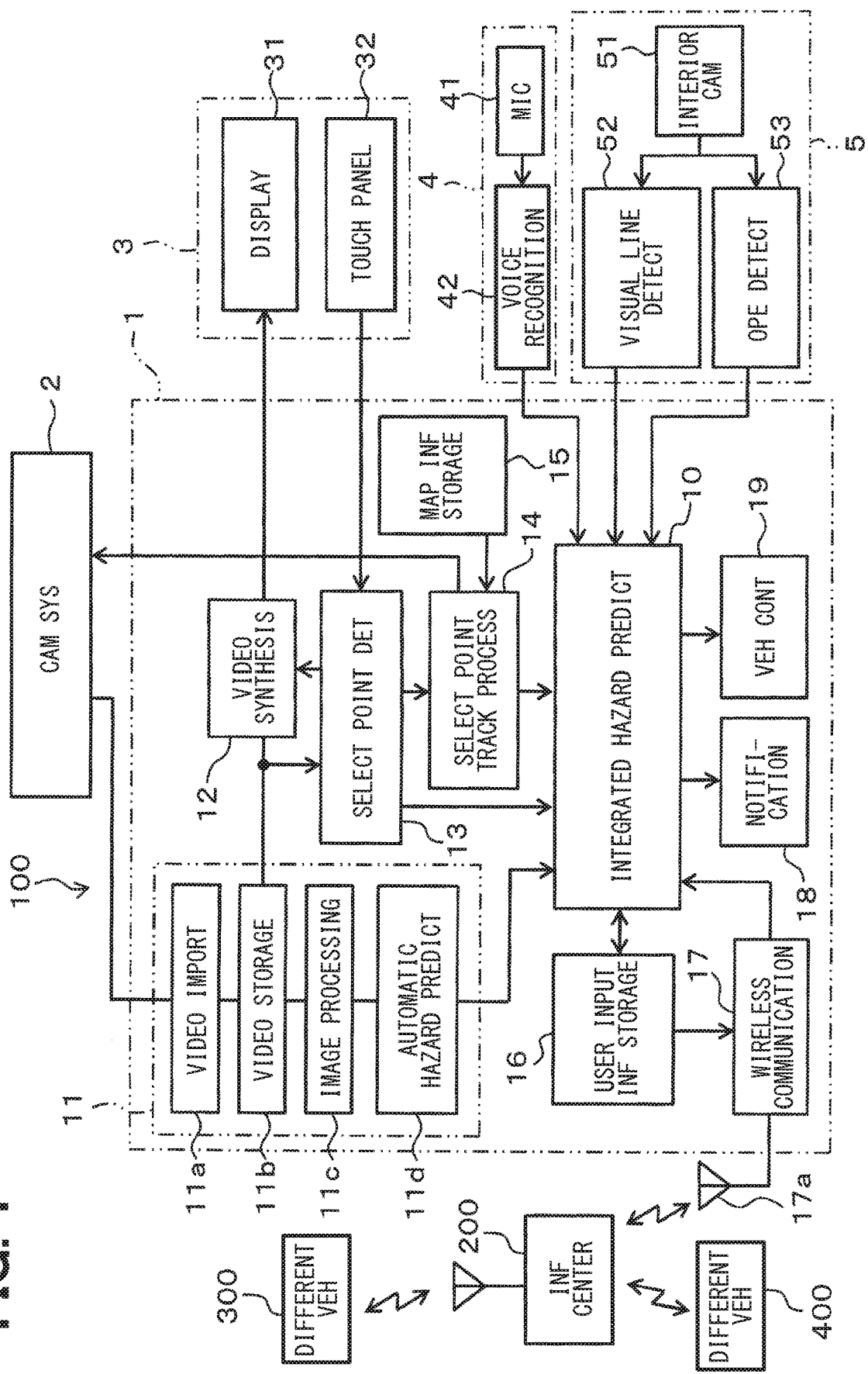
FIG. 1 is a block diagram illustrating an electric configuration of an embodiment.

FIG. 1 illustrates an overall configuration of an autonomous driving assistance device 100. The autonomous driving assistance device 100 performs an avoidance remedy to avoid hazards during automatic operation based on the automatic operation system that performs automatic operation control on a vehicle. The autonomous driving assistance device 100 includes a control portion 1, a camera system 2, a display device 3, a voice input portion 4, and a state detection device 5. The control portion 1 controls the implementation of the avoidance remedy. The camera system 2 captures the forward of the vehicle. The display device 3 displays images. The voice input portion 4 is used for voice input. The state detection device 5 detects the driving states of a driver. The display device 3, the voice input portion 4, and the state detection device 5 configure a human-machine interface (HMI) functioning as an information input portion used by a user such as a driver or a passenger.

The camera system 2 captures the forward and surroundings of the vehicle and imports image information around the vehicle needed for the automatic operation. The vehicle is mounted with a plurality of cameras that capture the image information to be imported into the control portion 1. The display device 3 is placed at a position to be viewed from a driver's seat. The display device 3 includes a display portion 31 to display images and a touch panel 32 placed on the surface of the display portion 31. When touched by a driver, the touch panel 32 recognizes information corresponding to the position touched on the display portion 31 as input information and supplies the input information to the control portion 1. A head-up display may be used for the display portion 31. In this case, the touch panel 32 can be replaced by the voice input portion 4 for voice input or the state detection device 5 using gestures or finger pointing to enter positions.

The voice input portion 4 includes a microphone 41 to enter the driver's voice and a voice recognition portion 42. The voice recognition portion 42 imports the driver's voice supplied from the microphone 41, performs an analysis process by using voice recognition software, and supplies the control portion 1 with words or voice uttered from the driver. The voice recognition portion 42 may be provided inside the control portion 1.

The state detection device 5 includes an interior camera 51, a driver's visual line detection portion 52, and a driver's operation detection portion 53. The interior camera 51 captures the appearance of the driver in the vehicle compartment. The captured image information is imported into the driver's visual line detection portion 52 and the driver's operation detection portion 53. The driver's visual line detection portion 52 and the driver's operation detection portion 53 may be provided inside the control portion 1.

The driver's visual line detection portion 52 uses the analysis software to analyze the driver's visual line captured by the interior camera 51, detects to which direction the driver faces, and supplies a detection result to the control portion 1. In this case, the position of an image ahead of the driver's visual line can be imported as the driver's input information. The driver's operation detection portion 53 uses the analysis software to analyze driver's actions captured by the interior camera 51, detects the driver's posture or hand movements, and supplies a detection result to the control portion 1.

The control portion 1 mainly includes an integrated hazard prediction portion 10 as an additional avoidance processing portion and further includes the following processing portions. The automatic hazard prediction processing portion 11 as a normal avoidance processing portion imports video from the camera system 2 and performs a normal hazard prediction process to be implemented on the vehicle. The automatic hazard prediction processing portion 11 includes a video import portion 11a, a video storage portion 11b, an image processing portion 11c, and an automatic hazard prediction portion 11d. The video import portion 11a imports video information captured by the camera system 2 and stores the video information in the video storage portion 11b.

The image processing portion 11c applies image processing to the video information stored in the video storage portion 11b and extracts information needed for the hazard prediction during driving. The automatic hazard prediction portion 11d performs the hazard prediction process on targets or states anticipated to suffer from a predetermined hazard based on the information extracted by the image processing portion 11c and outputs a result to the integrated hazard prediction portion 10.

The video storage portion 11b outputs video information to a video synthesis portion 12 and a selection point determination portion 13 as a determination portion. The video synthesis portion 12 synthesizes image information from the video storage portion 11b and selection point information from the selection point determination portion 13 and outputs synthesized information to the display portion 31 of the display device 3 to display the synthesized information. The selection point determination portion 13 determines a selection point that is displayed as a position in the screen on the display portion 32 and is selected and entered by a driver by using the touch panel 32.

A selection point trail processing portion 14 as a trail portion trails the movement of the selection point determined by the selection point determination portion 13 corresponding to the movement of the vehicle based on map information data in a map information storage portion 15 as a map information provision portion and outputs a result to the integrated hazard prediction portion 10. A user input information storage portion 16 as a storage portion records user input information from the integrated hazard prediction portion 10. The user input information storage portion 16 outputs the stored user input information to the integrated hazard prediction portion 10 in response to a read request. The user input information is entered by a driver or a passenger as a user through the use of the display device 3, the voice input portion 4, and the state detection device 5.

A wireless communication portion 17 as a communication portion uses an antenna 17a to exchange information with the outside through the use of wireless communication. The wireless communication portion 17 transmits the user input information in the user input information storage portion 16 to an external information center 200 or outputs information transmitted from the information center 200 to the integrated hazard prediction portion 10. The information center 200 accepts user input information from not only subject vehicle P but also a different vehicle 300 or 400 equipped with the automatic operation system and is configured to be able to interchangeably use these pieces of user input information.

A notification portion 18 outputs notification information, caution information, or warning information to an audiovisual information provision device used by a driver based on an instruction from the integrated hazard prediction portion 10. A vehicle control portion 19 controls vehicle operations based on control information that is supplied from the integrated hazard prediction portion 10 and is needed to avoid hazards.

The description below explains operations of the above-described configuration with reference to FIGS. 2 through 13. The present embodiment assumes that the automatic hazard prediction portion 11d performs a hazard prediction process based on ordinary automatic operation. The automatic hazard prediction processing portion 11 allows the video import portion 11a to import video from the camera system 2, stores the video in the video storage portion 11b, and allows the image processing portion 11c to perform an image process.

The automatic hazard prediction processing portion 11 supplies information to the integrated hazard prediction portion 10 based on the video information processed by the image processing portion 11c to ensure safe traveling by applying the hazard prediction to areas or objects corresponding to a predetermined hazard prediction process. During the automatic operation, the integrated hazard prediction portion 10 uses a hazard prediction process based on the information from the automatic hazard prediction processing portion 11 as a normal hazard prediction process.

According to the present embodiment, the user such as a driver or a passenger can specify an area or an object inapplicable to targets for the automatic hazard prediction processing portion 11. Besides the above-described normal hazard prediction process, the control portion 1 performs a hazard prediction process by accordingly specifying a surveillance target to provide automatic travel control while avoiding hazards.

Figure 2:
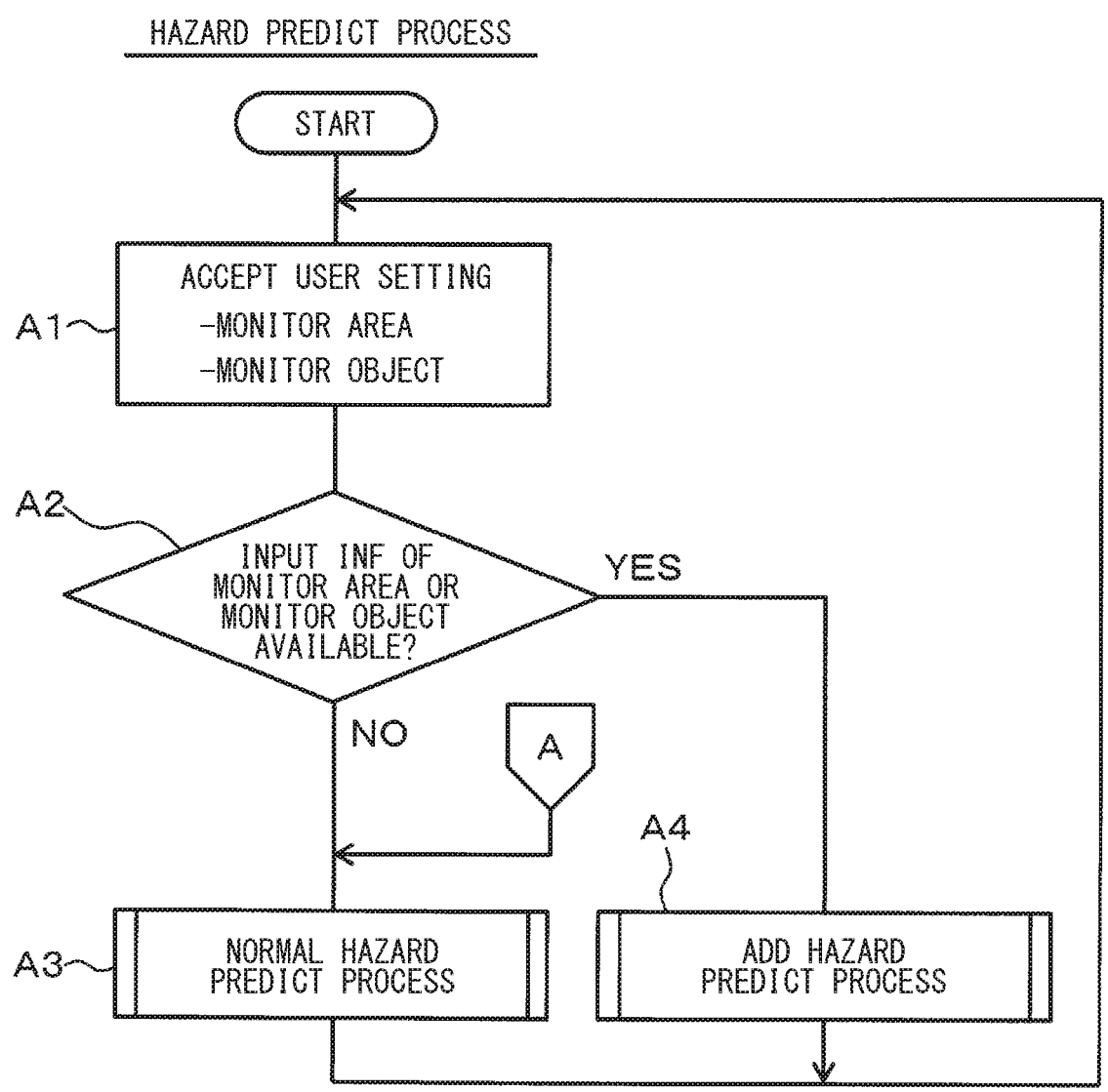
FIG. 2 is a flowchart illustrating a hazard prediction process.

FIG. 2 illustrates an overall flow of the hazard prediction process performed by the control portion 1. In step A1, the control portion 1 accepts input of settings supplied by the user such as a driver or a passenger. The user setting can specify a surveillance target, namely, a surveillance area or a surveillance object inapplicable to targets for the automatic hazard prediction processing portion 11. The surveillance area denotes an area that necessitates attention to the travel direction of the vehicle. The surveillance object denotes an object such as a human or a vehicle near the traveling vehicle.

The above-described user setting specifies a point at or near which the user requires subject vehicle P to perform the attentive travel when the vehicle is kept under the automatic operation control. The user setting can select an intended point in manner of tap, double-tap, or "swipe," for example, on the touch panel 32 to recognize the point by the use of an image that is captured by the camera of the camera system 2 and is displayed on the display portion 31 of the display device 3.

Besides the above-described methods, for example, the user setting can include input by touching a point on an electronic map displayed on the display portion 31 or input to the microphone 41 by allowing the user to utter a phrase such as "right of the next signalized intersection." Available input methods may enable the user to use an interactive configuration, if possible, or allow a state recognition device 5 to recognize gestures such as finger pointing. Still another available input method may allow the driver to indicate an intended object by using the visual line while manipulating a switch provided for the steering wheel, for example.

In step A2, the control portion 1 determines whether there is input information such as a surveillance area or a surveillance object specified by the user setting. If there is no user-input information, the control portion 1 determines NO in step A2 and proceeds to the normal hazard prediction process in step A3. The automatic operation continues based on a program designed for the normal hazard prediction process while the automatic hazard prediction processing portion 11 performs operations to avoid hazards. Operations of the normal hazard prediction process are similar to those used for ordinary automatic operation and a description is omitted for simplicity.

Figure 3:
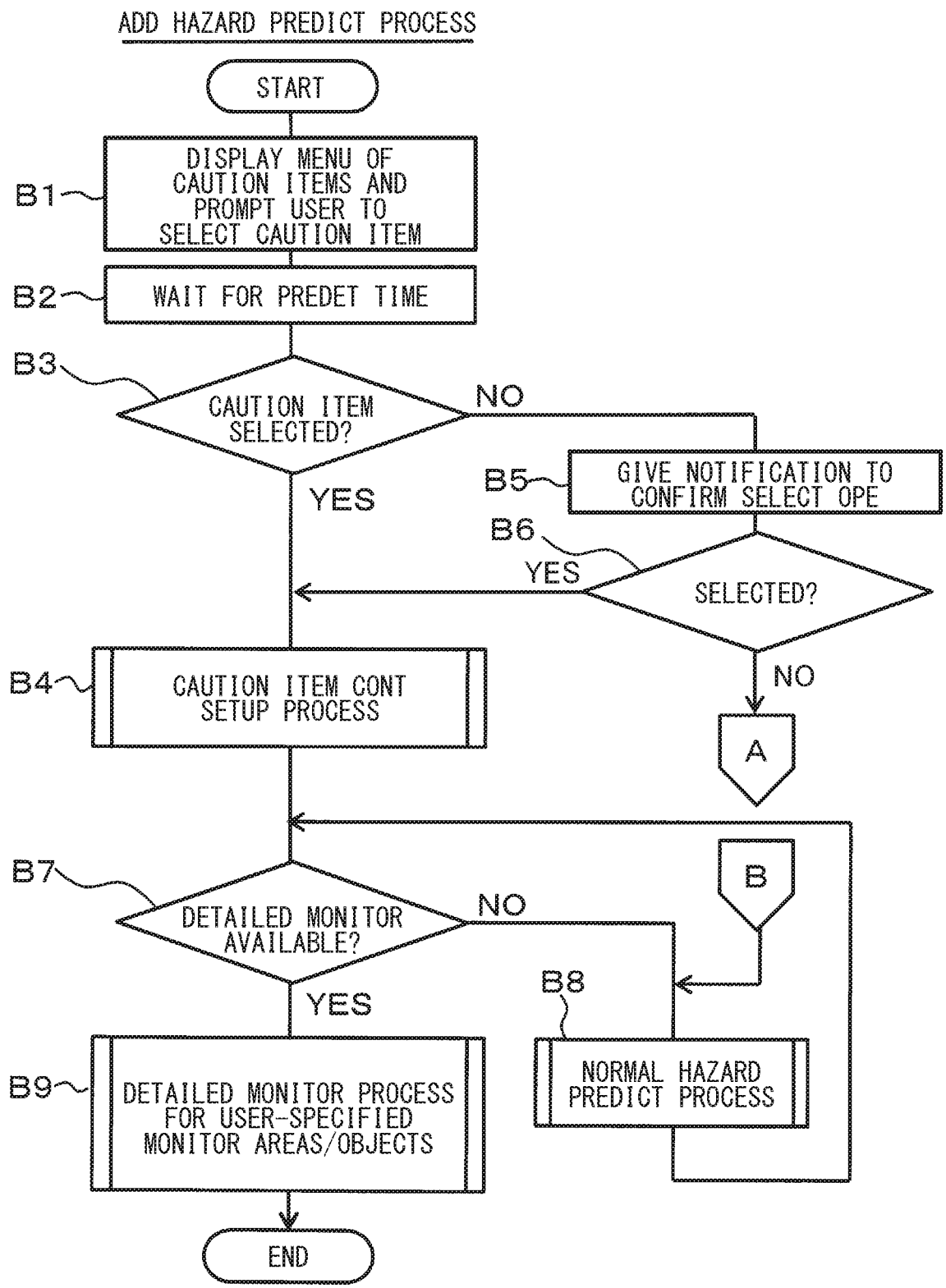
FIG. 3 is a flowchart illustrating an additional hazard prediction process.

If there is user-input information, the control portion 1 determines YES in step A2 and proceeds to the additional hazard prediction process in step A4. During the additional hazard prediction process, the control portion 1 allows the display portion 31 to display a plurality of caution items and prompts the user to select a caution item. Specifically, the additional hazard prediction process in FIG. 3 is performed. The caution items are provided with corresponding additional hazard avoidance remedies.

The description below explains examples of areas or objects the user can select and input during the above-described process of the control portion 1 in step A1. The user can select an area intended for the hazard prediction by "swiping" with a finger or an object such as a moving object or a human by tapping with a finger from the screen displayed on the display portion 31.

As above, surveillance areas or surveillance objects specifiable on the display portion 31 are available as (1) road area and (2) alarming area or an object, for example. These are identified by the use of recognition IDs as follows.

(1) Road Area

The road area is settled on an electronic map regardless of user positions. The road area is defined as an area on a road based on three-dimensional space coordinates and is comprised of a plurality of spots (points) and a line as a boundary connecting these points. Stationary objects within an area are given stationary IDs as stationary names described below, for example.

Road positions are given ID=1000 as the right side and ID=1050 as the left side.

As intersection positions, an entire intersection is given ID=1000. The right side of an intersection is given ID=1110. The position behind an intersection is given ID=1120. The left side of an intersection is given ID=1130. The position ahead of an intersection is given ID=1140.

A crossing is given ID=1300. A sidewalk is given ID=1310.

(2) Alarming Area

The alarming area alarms the user or is specified as being alarmed by the user because of travel situations, travel environment (dead zone), or the presence of surrounding vehicles or pedestrians. For example, the user is alarmed in a road area where the user's vehicle is going to pass and an unsuccessfully viewed moving object may suddenly fly out.

For example, the alarming area represents an area behind a stopped vehicle ahead, a poorly visible area in a right-left direction at an intersection, or a dark spot on an illuminated road at night. Further, the alarming area also includes an area that needs to be closely observed when there are many moving objects around the subject vehicle.

The alarming area is given ID=9000 specific to a surveillance area, for example.

The existence of a surveillance object may be recognized in the alarming area. Then, moving objects are given recognition IDs as defined below.

The recognition IDs are linked with caution items for display. The caution items are selected correspondingly to the recognition IDs and are displayed in the order of priorities. In this case, the display priorities depend on the user's tendency such as a place where the driver carefully performs manual operations or road situations in the selected area such as congestion or construction.

As above, objects that can be specified by tapping the display portion 31 include a moving object, for example. As moving objects, for example, a vehicle is given ID=100. A pedestrian is given ID=200. Other movable objects are given appropriate IDs as needed.

There may be a surveillance object that is not displayed on the screen of the display portion 31. Such a surveillance object is given ID=9500, for example. This case applies when the user can confirm a vehicle outside the window but the camera cannot capture an image, for example. It is impossible to specify an image on the display portion 31. For this reason, it is possible to previously settle a manipulation area or switch to select a surveillance object not displayed on the screen.

For example, a touch on the upper light of the screen settles a parallel traveling object at the right of the vehicle. A touch on the upper left of the screen settles a parallel traveling object at the left of the vehicle. When an object is recognized, the object is given a moving object ID defined above. Caution items are linked with the moving objects to which the corresponding IDs are given. A caution item is automatically selected based on the position (existence area) of the moving object and is displayed on the display portion 31.

When a moving object is selected by tapping to display the caution item, caution items or display menu items vary with the existence of the moving object or a position or an existence area to which the moving object moves. Objects can be specified in manners other than "swipe" and tap above. It is also possible to provide an instrument to enter a specified range or a switch to complete the input operation.

The control portion 1 performs the above-described additional hazard prediction process according to a flowchart illustrated in FIG. 3. In step B1 of FIG. 3, the control portion 1 reads a plurality of caution items corresponding to surveillance areas/objects as the user input information, allows the display portion 31 to display the caution items, and prompts the user to select a caution item.

The integrated hazard prediction portion 10 of the control portion 1 is previously assigned caution items to be displayed corresponding to various surveillance areas or surveillance objects as the user input information. The caution item is displayed in a region that belongs to the image displayed on the display portion 31 ahead of the vehicle and hardly affects the travel. Alternatively, the caution item is displayed translucently so that a display item can be viewed and an image ahead of the vehicle is not hidden.

A display example of caution items with respect to an area designated as an alarming area is preliminarily set as follows.

(1) The alarming area represents the shadow of a stopped vehicle and the shadow of a moving object may move or an object generating the shadow may move, for example. In this case, the caution items mainly include "watch for emerging objects," "slow," "travel to the left," and "watch for human figures."

(2) The alarming area represents a poorly visible intersection and no objects may move behind a stationary object, for example. In this case, the caution items mainly include "slow," "watch for right and left," "watch for pedestrians," and "stop."

(3) The alarming area represents a dark place on the road at night despite the illumination using a headlamp and the light intensity may be low as a travel environment, for example. In this case, the caution items mainly include "watch for pedestrians," "keep center," "watch for roadside," and "high beam (to increase the visibility of a dark place)."

(4) The alarming area represents a sidewalk environment of many pedestrians and an increased load may be applied to a pedestrian detection process as a travel environment, for example. In this case, the caution items mainly include "watch for pedestrians," "keep center," "slow," "watch for roadside," and "keep lane."

(5) The alarming area represents a road with many bicycles traveling and an increased load may be applied to a bicycle detection process as a travel environment, for example. In this case, the caution items mainly include "keep center," "watch for backward," "watch for contact," and "slow."

As above, vehicle manufacturers provide initial settings for "caution items" that provide general users with information about necessary cautions to avoid traffic accidents at relevant road areas. Generally, however, users specify diverse alarming areas that depend on the driver performance or emotional factors of the users. For example, a user may need a "caution item" other than included in the displayed "caution items" as the initial setting. In such a case, it is possible to deliver that "caution item" to the vehicle and add the user-specified "caution item."

When the user requests to add a "caution item" to the user-specified alarming area, the control portion 1 uses a learning function to store the requested "caution item" in the user input information storage portion 16. The user may travel the relevant place next time and encounter a similar road situation (such as the existence of a dead zone due to a vehicle stopped on the road). In such a case, the place can be automatically registered as an alarming area though the place is not predetermined as an alarming area. It is also possible to reduce unnecessary user operations.

The above-described "caution items" are displayed according to the capabilities of safe travel control functions supplied by vehicle manufacturers. For example, a vehicle equipped with an automatic brake can display "watch your distance" as a caution item to ensure a distance from the preceding vehicle and avoid collision with the preceding car even when the automatic brake is operated.

In step B2, the control portion 1 waits for a predetermined time. In step B3, the control portion 1 determines whether the user selects a caution item. If the user selects a caution item, the control portion 1 determines YES in step B3, proceeds to step B4, and performs a caution item control setup process as an additional hazard avoidance remedy.

If the user selects no caution item, the control portion 1 determines NO in step B3, proceeds to step B5, and performs a notification operation to confirm the selection operation. Specifically, the control portion 1 notifies the user by allowing the integrated hazard prediction portion 10 to output notification information prompting the selection to the notification portion 18.

The control portion 1 then proceeds to step B6. If the user selects a caution item in response to the above-described notification operation, the control portion 1 proceeds to step B4 and performs the caution item control setup process. If the user selects no caution item, the control portion 1 proceeds to the normal hazard prediction process in step A2 of FIG. 2.

Figure 4:
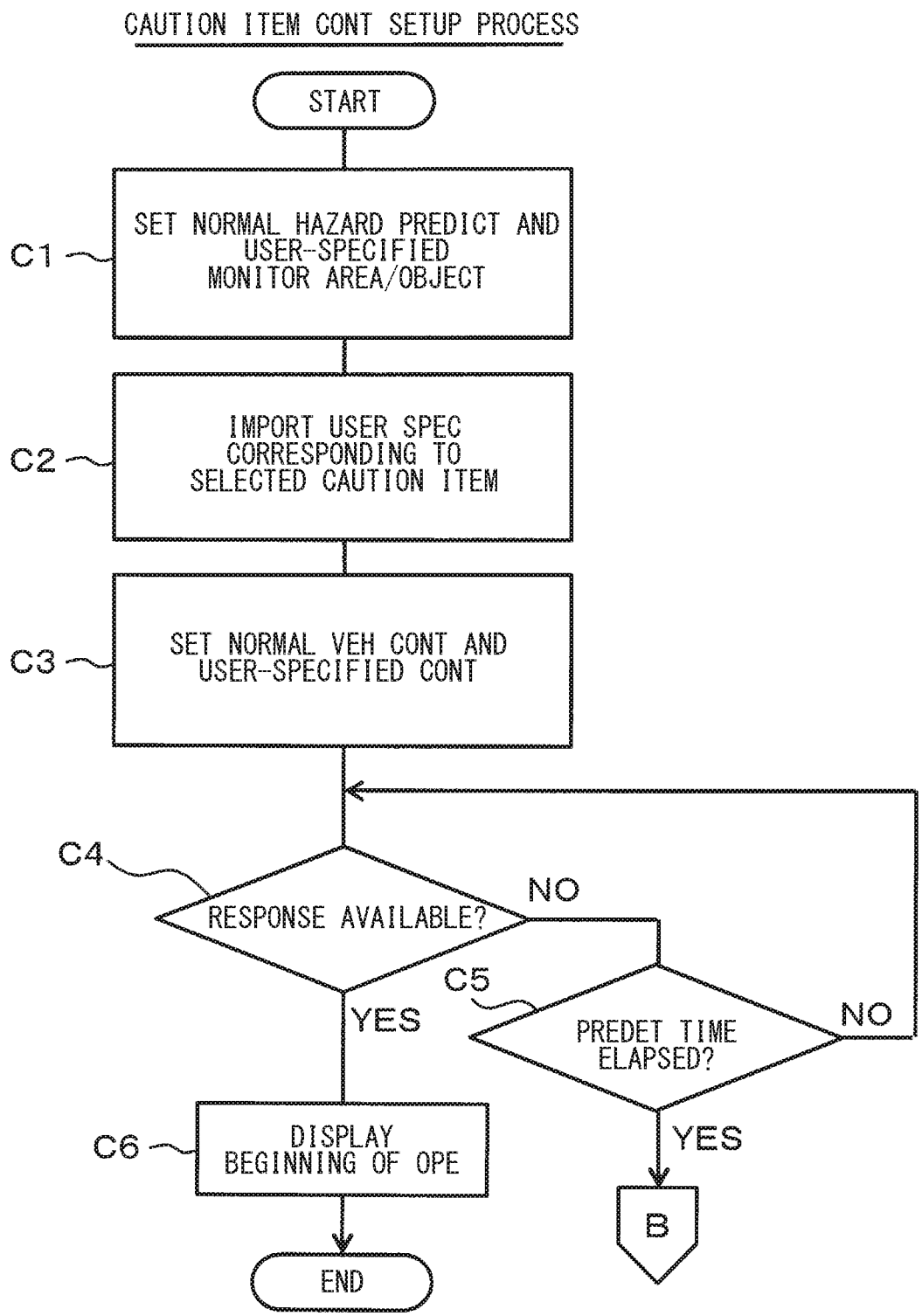
FIG. 4 is a flowchart illustrating a control setup process for caution items.

With reference to FIG. 4, the description below explains the overall contents of the caution item control setup process. This process depends on targets as surveillance areas or surveillance objects specified by the user. Specific processing details will be explained by the use of case examples to be described later.

In step C1 of FIG. 4, the control portion 1 sets the contents of the normal hazard prediction and the contents of the hazard prediction concerning the user-specified surveillance area/object. The automatic hazard prediction processing portion 11 sets normal hazard predictions. Surveillance targets are previously set depending on places or situations. Items are set depending on a situation at the time when the process is performed.

In step C2, the control portion 1 imports one caution item selected by the user as the user specification in terms of a plurality of caution items displayed on the display portion 31 corresponding to the user-specified surveillance area/object. In step C3, the control portion 1 configures the setting to provide the normal vehicle control corresponding to the normal hazard prediction and control items corresponding to the caution items for the user-specified surveillance area/object.

In step C4, the control portion 1 determines whether there is available a real-time response to the set control item. If the result is NO and no response is available, the control portion 1 proceeds to step C5 and waits until a predetermined time elapses. If no response is available after a lapse of the predetermined time, the control portion 1 determines YES in step C5 and proceeds to the normal hazard prediction process in step B8 above.

If step C4 results in YES, the control portion 1 proceeds to step C6, allows the display portion 31 to display the beginning of the operation control, terminates the process in step B4 in FIG. 3, and proceeds to step B7. The control portion 1 determines whether the vehicle enters a range capable of detailed surveillance on the surveillance area or the surveillance object for which the vehicle is set. The range capable of detailed surveillance on the surveillance object signifies a range capable of performing the hazard prediction process on the surveillance object.

The control portion 1 proceeds to step B7 and determines whether the detailed surveillance is available, namely, the vehicle enters the range capable of performing the hazard prediction process. The control portion 1 uses the selection point trail processing portion 14 to predict the distance from the vehicle and determine the entry to the predetermined range based on the current position information or the movement position information about surveillance objects. If the vehicle does not enter the range capable of performing the hazard prediction process, the control portion 1 determines NO in step B7, proceeds to step B8, and performs the normal hazard prediction process to wait until the determination in step B7 results in YES. This situation assumes that the user-specified surveillance area or surveillance object corresponds to a distant point and the vehicle cannot perform the hazard prediction process yet. The normal hazard prediction process in step B8 is equal to the normal hazard prediction process in step A3 of FIG. 2 above.

If the vehicle enters the range capable of performing the hazard prediction process, the control portion 1 determines YES in step B7, proceeds to step B9, and starts a detailed surveillance process on the user-specified surveillance area/object.

Figure 5:
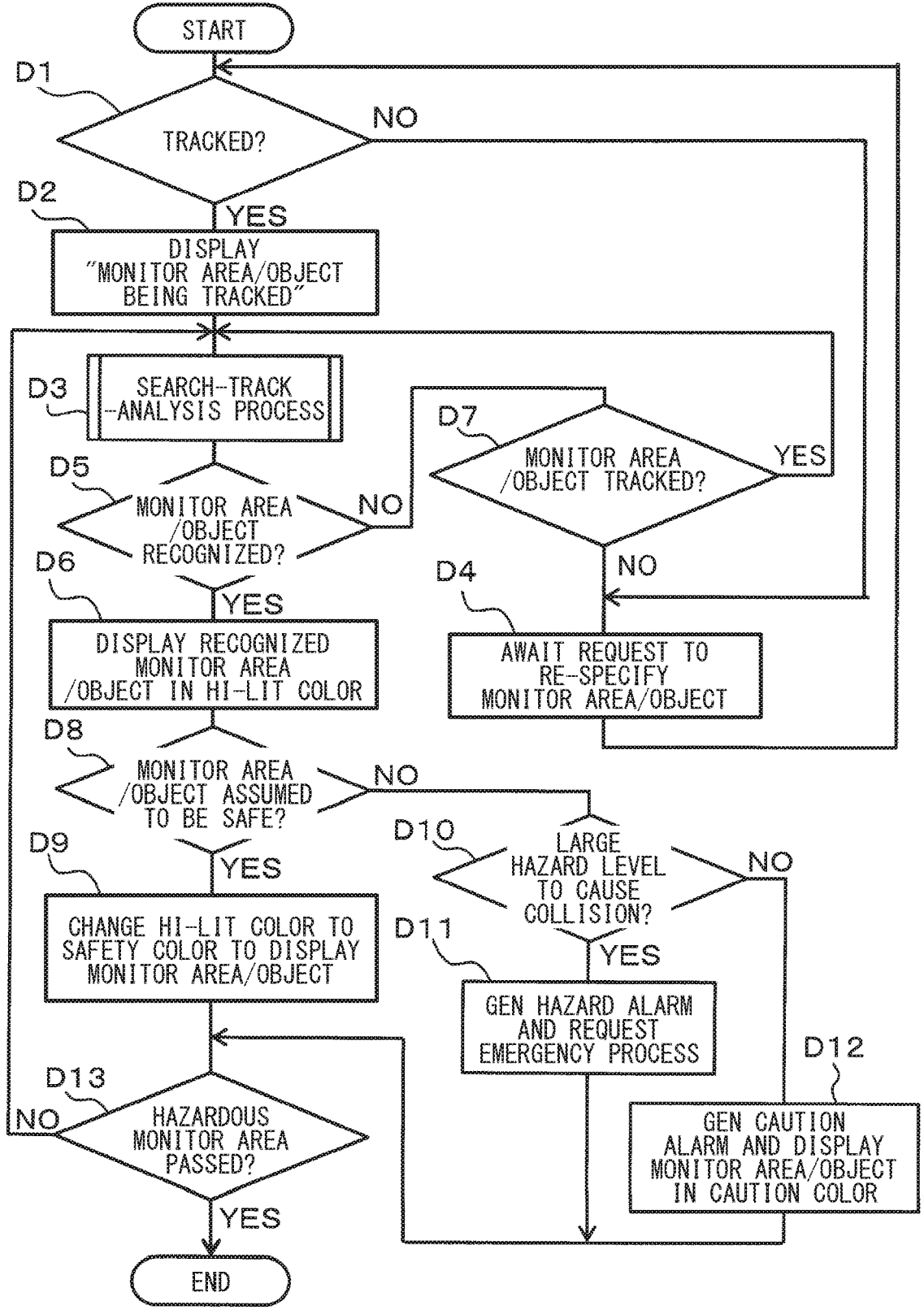
FIG. 5 is a flowchart illustrating a detailed surveillance process for a group of specified objects.

With reference to FIG. 5, the description below explains the overall contents of the detailed surveillance process on surveillance areas/objects. This process also depends on targets as surveillance areas or surveillance objects specified by the user. Specific processing details will be explained by the use of case examples to be described later.

In step D1 of FIG. 5, the control portion 1 determines whether the surveillance area or the surveillance object is trailed. If the specified surveillance area or surveillance object is trailed or surveilled, the control portion 1 determines YES in step D1, proceeds to step D2, and allows the display portion 31 to display "surveillance area/object being trailed." The control portion 1 then proceeds to a search-trail-analysis process in step D3.

If the specified surveillance area or surveillance object is not trailed or surveilled, the control portion 1 determines NO in step D1, proceeds to step D4, and waits until the surveillance area/object is re-specified by prompting the user to re-specify the surveillance area/object. In this case, the wait time can be limited. If the resetting fails, the control portion 1 can return to the beginning and start the process in FIG. 2 to newly specify a surveillance area/object.

If the user-specified surveillance area/object succeeds in the reconfiguration and is trailed as above, the control portion 1 proceeds to steps D1, D2, and D3 to start the search-trail-analysis process. This process increases the sensing accuracy concerning the user-specified surveillance area/object. The search-trail-analysis process will be explained with reference to FIG. 6 after the explanation of the detailed surveillance process on surveillance areas/objects.

After step D3, the control portion 1 proceeds to step D5 and determines whether the user-specified surveillance area/object is recognized. If the surveillance area/object is recognized, the control portion 1 determines YES in step D5, proceeds to step D6, and allows the display portion 31 to display the recognized surveillance area/object in highlight color.

If the user-specified surveillance area/object is not recognized, the control portion 1 determines NO in step D5, proceeds to step D7, and determines whether the user-specified surveillance area/object is trailed. If the user-specified surveillance area/object is trailed, the control portion 1 determines YES in step D7 and returns to D3 to repeat the search-trail-analysis process. If the user-specified surveillance area/object is not trailed, the control portion 1 determines NO in step D7, proceeds to step D4, and returns to step D1.

The control portion 1 performs step D6, proceeds to step D8, and determines whether the user-specified surveillance area/object is safe. If step D8 results in YES, the control portion 1 proceeds to step D9 and allows the display portion 31 to display the user-specified surveillance area/object by changing the highlight color to safety color representing a safe state.

The control portion 1 determines NO in step D8 if the user-specified surveillance area/object indicates a large hazard level. The control portion 1 proceeds to step D10 and determines whether the user-specified surveillance area/object indicates a large hazard level and subject vehicle P is highly likely to collide.

The control portion 1 determines YES in step D10 if the user-specified surveillance area/object indicates a large hazard level and subject vehicle P is highly likely to collide. The control portion 1 proceeds to step D11 and generates a hazard alarm. There may be a case where an automatic travel system does not start an emergency process even though the hazard level is high. In such a case, the control portion 1 requests an emergency process and prompts the user to enter information about the hazard area or object. When the user enters the hazard area/object, the control portion 1 notifies the corresponding position to the automatic travel system so that the automatic travel system can use the position for the control. Alternatively, the user switches to the manual operation to avoid the hazard.

The control portion 1 determines NO in step D10 if the user-specified surveillance area/object does not indicate a large hazard level and subject vehicle P is less likely to collide. The control portion 1 proceeds to step D12, generates a caution alarm, and calls attention to the user by changing the display color to caution color used for the state of displaying the user-specified surveillance area/object on the display portion 31.

The control portion 1 proceeds to step D13 and determines whether subject vehicle P passes through a hazardous surveillance area/object. If step D13 results in YES, this process terminates. If step D13 results in NO, the control portion 1 returns to step D3 and repeats the above-described process.

When the detailed surveillance process terminates on the user-specified object in step B9 above, the control portion 1 terminates the additional hazard prediction process and again performs the hazard prediction process illustrated in FIG. 2.

Figure 6:
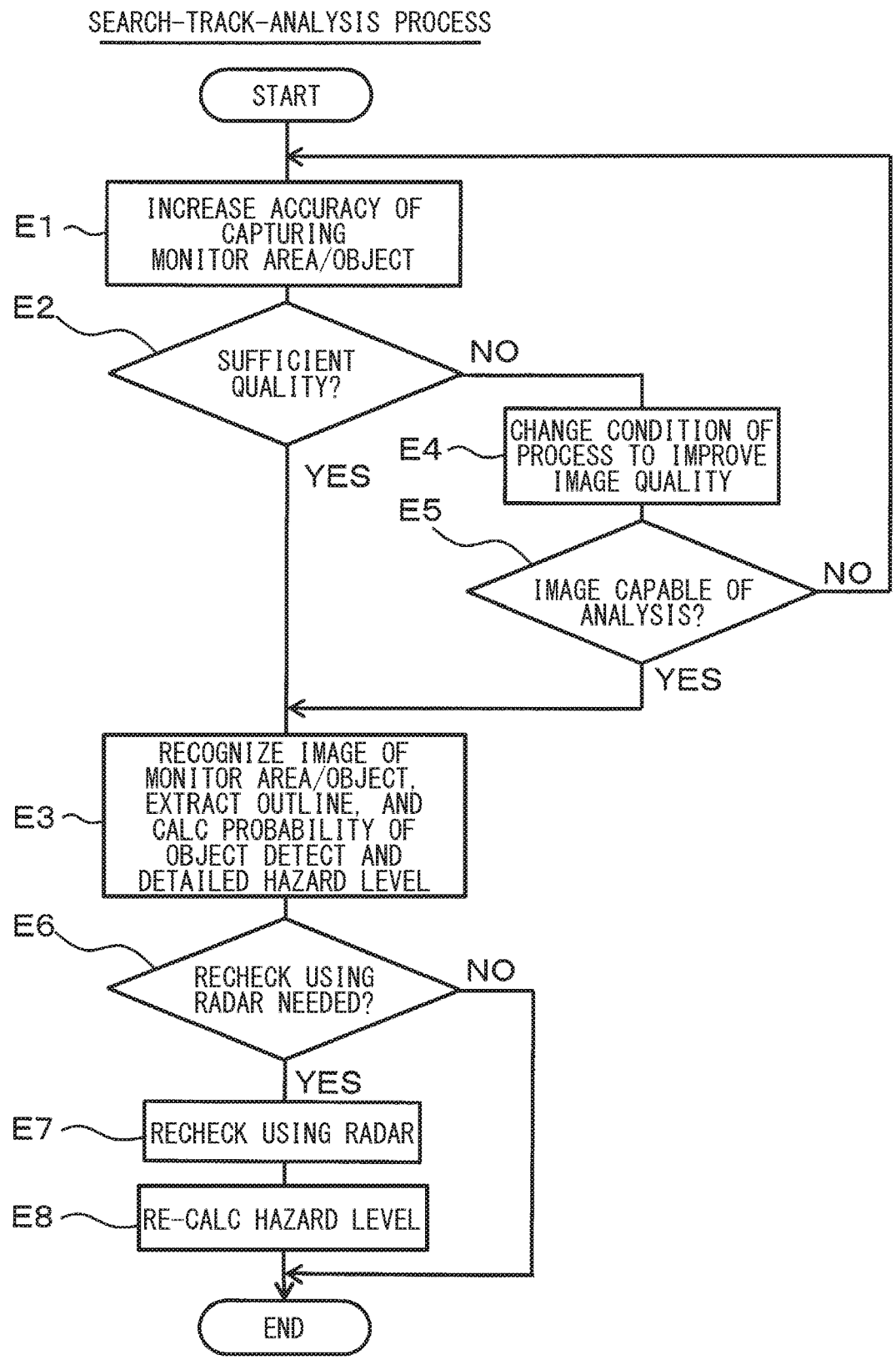
FIG. 6 is a flowchart illustrating a search-trail-analysis process.

With reference to FIG. 6, the description below explains the overall contents of the search-trail-analysis process. This process is performed in an automatic travel control system. The automatic travel control system trails a user-specified surveillance area/object by using a camera and a radar included in the camera system 2. When step D1 results in YES in FIG. 5, control is provided to trail a surveillance area/object. The camera can capture a surveillance area/object.

In step E1 of FIG. 6, the control portion 1 performs a process to increase the accuracy of the camera system 2 to capture images. The process to increase the accuracy of image capturing corrects the zoom, focus, brightness, and vibration of the camera to provide a capture condition that facilitates the later image processing.

In step E2, the control portion 1 determines whether an image captured under the adjusted condition ensures sufficient image quality. If the image quality is sufficient, the control portion 1 determines YES in step E2, proceeds to step E3, and performs an image recognition process. If step E2 results in NO, the control portion 1 proceeds to step E4 and changes the condition of the process to improve the image quality. In step E5, the control portion 1 determines whether the image is capable of analysis. If step E5 results in NO, the control portion 1 returns to step E1 and repeats the above-described process. When step E2 results in YES, the control portion 1 proceeds to step E3.

In step E, the control portion 1 performs the image recognition process to extract an outline, find the probability of object detection, and predict the movement and estimates the probability of colliding with a surveillance area/object. This closely estimates a hazard level for the surveillance area/object.

In step E6, the control portion 1 determines whether recheck using the radar is necessary for the surveillance area/object as a target. The control portion 1 performs recheck using the radar when the hazard level calculated in step E3 is higher than or equal to a predetermined value. If step E6 results in NO to eliminate the need for a recheck, the control portion 1 terminates the process.

If step E6 results in YES, it is determined that the recheck is needed through the use of the radar. In this case, the control portion 1 proceeds to step E7 and performs the recheck. In step E8, the control portion 1 measures a distance to the surveillance area/object and closely recalculates the hazard level. As a result, the control portion 1 can highly accurately calculate the hazard level based on the results of the image analysis and the distance measurement. The control portion 1 then terminates the process.

As above, when the user specifies a surveillance area, the control portion 1 performs the learning function and thereby allows the user input information storage portion 16 to store the surveillance area and information such as the place or the situation to specify the surveillance area. When the automatic operation is performed, the control portion 1 imports the information about the surveillance area stored in the user input information storage portion 16 into items of the normal hazard prediction. It is possible to provide the automatic operation control suitable for the user request.

The user input information storage portion 16 also stores a user-specified "caution item" as well as the surveillance area. This "caution item" can be provided during the automatic operation.

The subsequent automatic operation reflects the information about the surveillance area or the "caution item" newly specified by the user, making it possible to increase the function of the automatic operation control suitable for the user.

A driving capability or state of the user may generate unnecessary surveillance area information or "caution item" information. In such a case, the control portion 1 can change the information in the user input information storage portion 16 as needed in response to a request from the user. The use of this learning function can make the automatic operation function more suitable for the user.

It is possible to use not only the information about surveillance areas or "caution items" specified by the user of subject vehicle P but also the information about surveillance areas or "caution items" specified by other users. This can be done by transmitting these pieces of information to the externally provided information center 200 via the wireless communication portion 17, for example.

In this manner, the control portion 1 can acquire information about surveillance areas or "caution items" specified by users of the different vehicles 300 and 400 from the information center 200 via the wireless communication portion 17. The control portion 1 can allow the automatic operation control to reflect these pieces of information in addition to the information about surveillance areas or "caution items" specified by the user of subject vehicle P.

It is also possible to provide only the information highly likely to be needed by providing effective information from the information center 200 depending on conditions such as the driving experience or the personality of the user of subject vehicle P.

CASE EXAMPLES

The above-described operations will be explained in four case examples as follows.

In a first case, the vehicle is approaching an intersection that exists ahead in the travel direction and is poorly visible on the left side. The driver as a user recognizes this situation and specifies the intersection as a surveillance area. In a second case, the drive recognizes a human figure near a vehicle stopping far in the travel direction of the subject vehicle and specifies the human figure as a surveillance object. In a third case, the driver found a dangerous vehicle weaving far in the travel direction of the subject vehicle and specifies the dangerous vehicle as a surveillance object. In a fourth case, another vehicle travels parallel to the subject vehicle and a driver of the parallel traveling vehicle uses a mobile phone, for example. The driver recognizes the parallel traveling vehicle as a dangerous vehicle and specifies this vehicle as a surveillance object.

First Case

Figure 7:
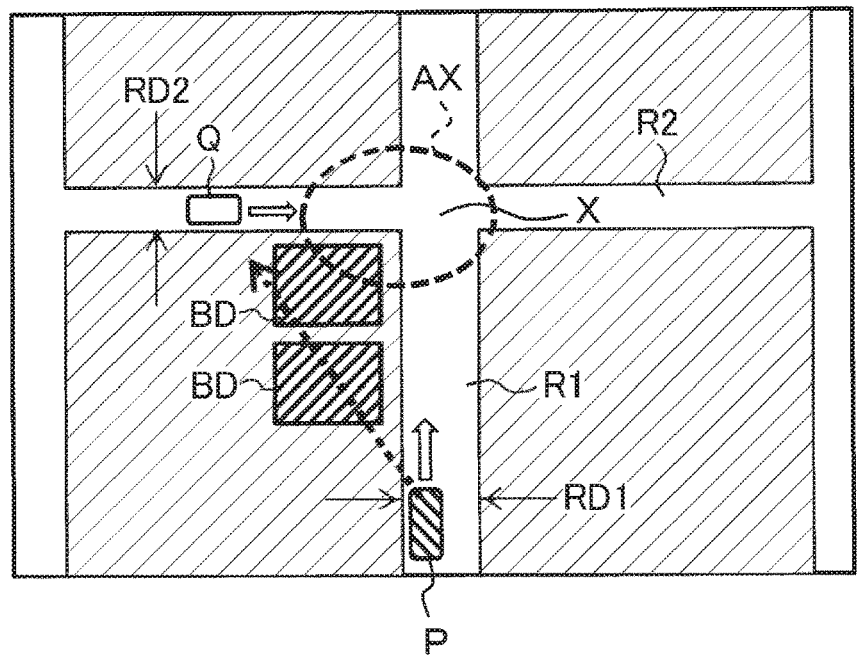
FIG. 7 is an explanatory diagram illustrating a situation of a first case (part 1)

FIG. 7 illustrates the first case. As seen from a map, subject vehicle P travels road R1 with road width RD1 in the direction of a white arrow along the lane to the left of centerline CL. There exists ahead intersection X intersecting with road R2 with road width RD2. Building BD exists on the left before intersection X. The left side of intersection X is poorly visible from subject vehicle P. Road R2 intersects with road R1 and has narrow road width RD2. Different vehicle Q travels road R2 toward intersection X from the left. Different vehicle Q is hardly visible when subject vehicle P approaches intersection X.

Figure 8:
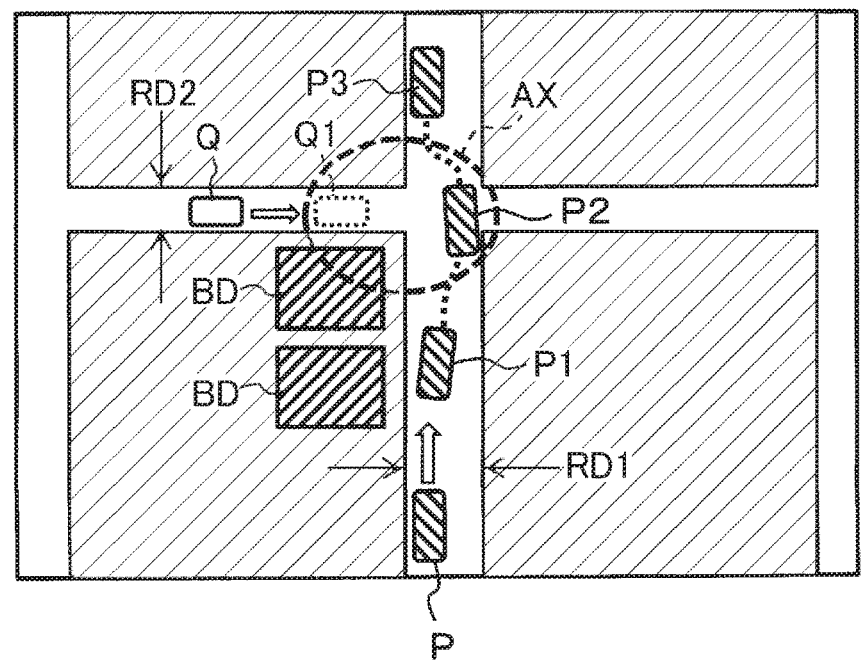
FIG. 8 is an explanatory diagram illustrating the situation of the first case (part 1)

In this situation as illustrated in FIG. 8, for example, suppose the user wishes to travel a path that approaches intersection X toward the right and follows a course including P1, P2, and P3 so that different vehicle Q1 approaching intersection X can avoid subject vehicle P.

Figure 9:
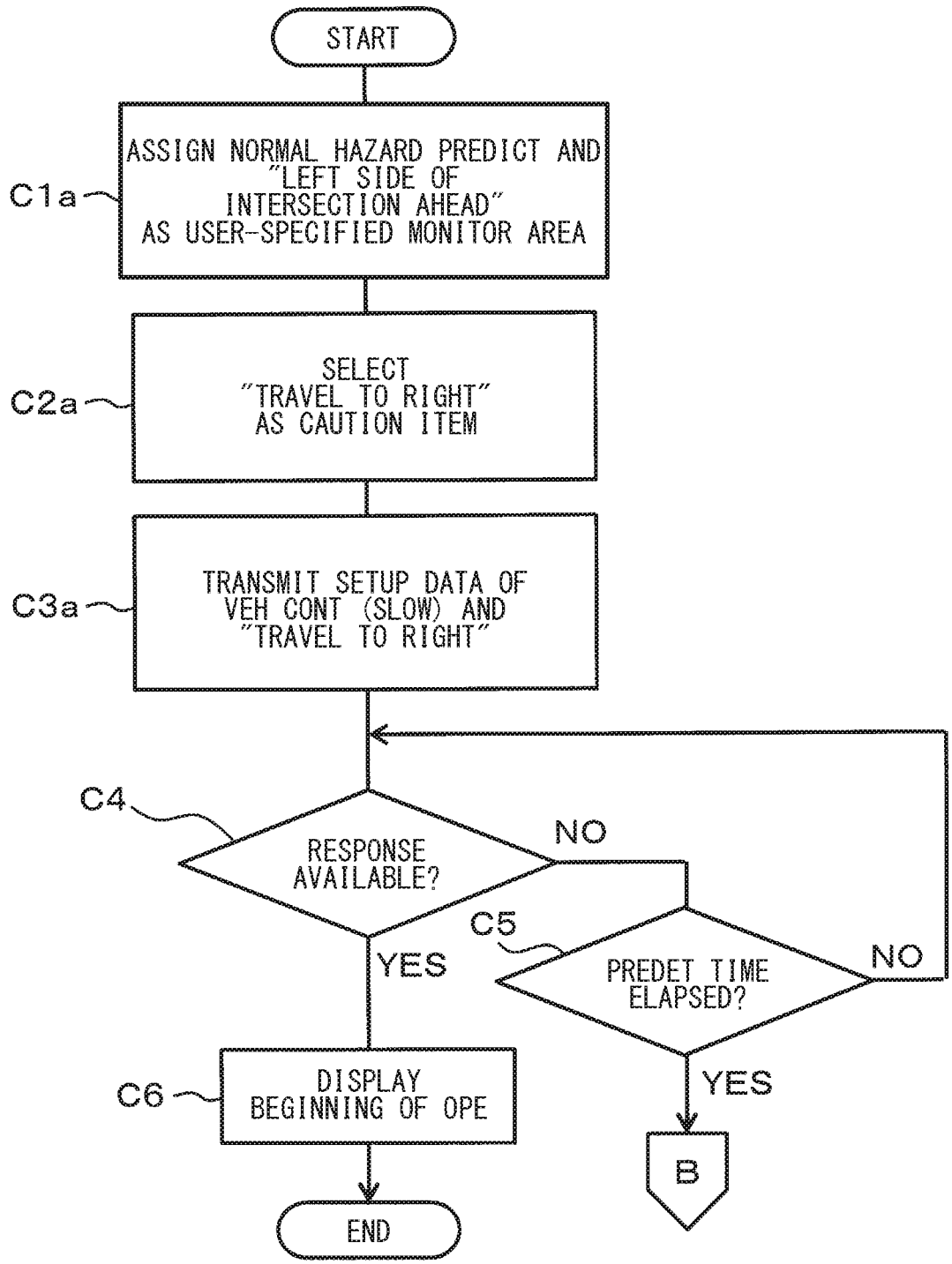
FIG. 9 is a flowchart illustrating a control setup process for caution items in the first case.
Figure 10:
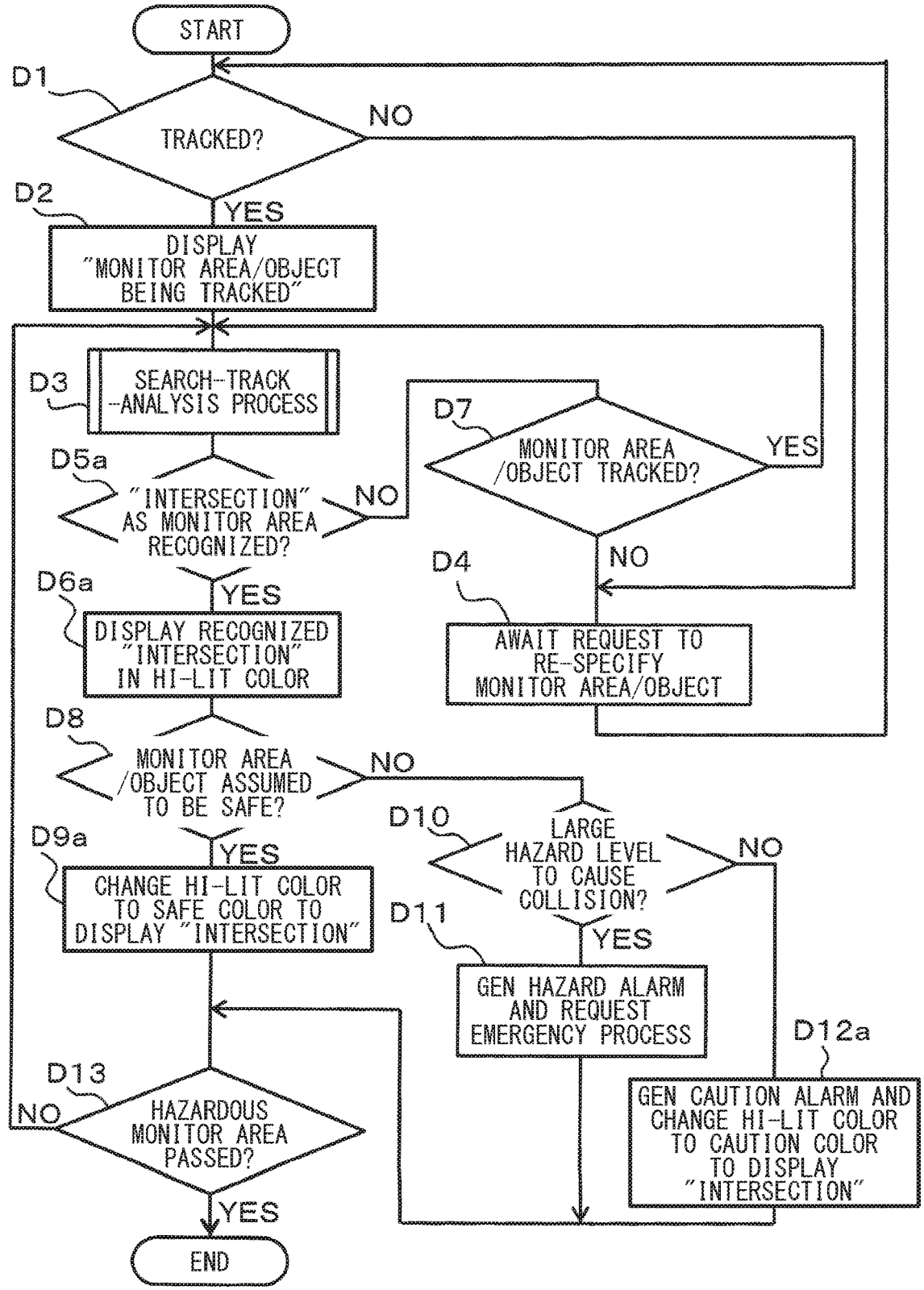
FIG. 10 is a flowchart illustrating a detailed surveillance process for a group of specified objects in the first case.

The first case will be further explained with reference to FIGS. 9 and 10 illustrating flows of the above-described processes and with reference to FIGS. 11 through 15 illustrating changes in display states on the display portion 31.

Figure 11:
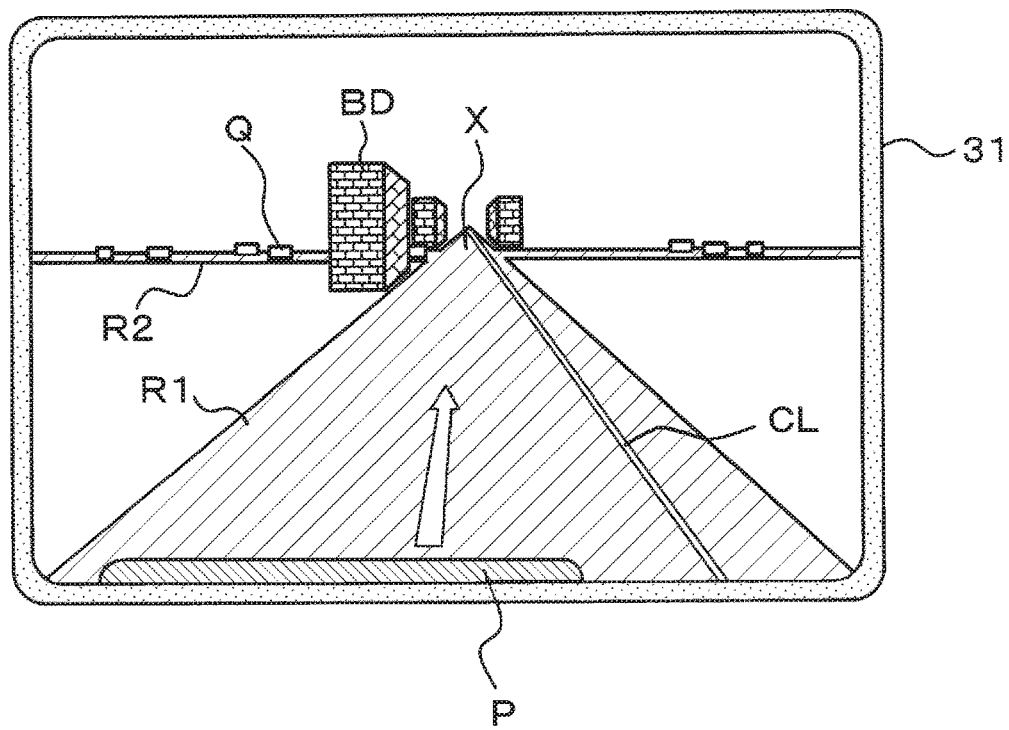
FIG. 11 illustrates a display screen for the first case (part 1)

FIG. 11 illustrates a display state of the display portion 31 in the first case. On the screen, subject vehicle P travels toward intersection X ahead. Different vehicle Q approaches intersection X on intersecting road R2 from the left. Building BD exists on the left before intersection X. Different vehicle Q further approaches intersection X and disappears from view. The user recognizes this situation and specifies the left vicinity of intersection X as a surveillance area on the display portion 31.

Road R1 is a priority road and is wider than road 2 (RD1>RD2). The user can recognize different vehicle Q that travels road R2 toward intersection X far from the user. The user worries about whether different vehicle Q suddenly appears from intersection X.

In this situation, an automatic hazard prediction process performed in the normal automatic operation system sets "slow" as the predetermined operation control when passing through an intersection ahead. When the user does not specify intersection X as a surveillance area, the control portion 1 controls the automatic hazard prediction processing portion 11 to decrease the speed during the travel near intersection X.

Figure 12:
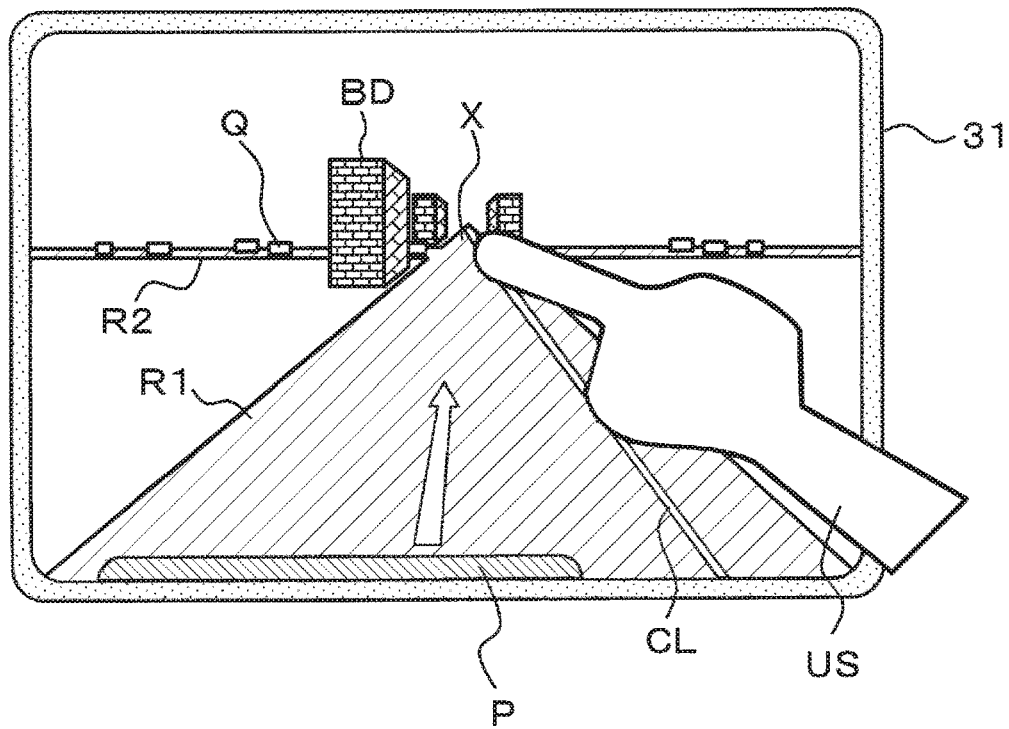
FIG. 12 illustrates a display screen for the first case (part 2)
Figure 13:
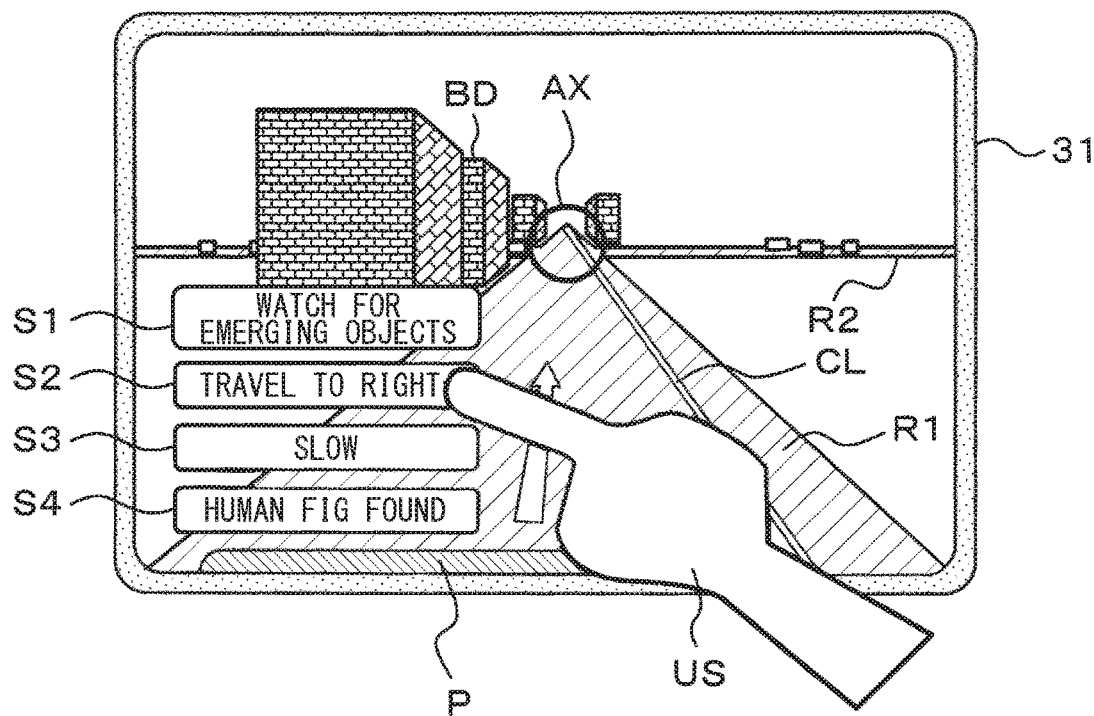
FIG. 13 illustrates a display screen for the first case (part 3)

As illustrated in FIG. 12, user US touches, with a finger, the left part of intersection X on the screen of the display portion 31 to generate input information that is then detected by the touch panel 32. The control portion 1 allows the selection point determination portion 13 of the control portion 1 to detect the input information from user US and outputs the input information to the integrated hazard prediction portion 10. As illustrated in FIG. 13, the control portion 1 allows the video synthesis portion 12 to output surveillance area AX touched on the screen to the display portion 31 so that surveillance area AX is displayed.

The control portion 1 outputs surveillance area AX detected by the selection point determination portion 13 also to the selection point trail processing portion 14. The control portion 1 performs a process that trails positions varying with the vehicle movement while referencing the map information in the map information storage portion 15. The selection point trail processing portion 14 outputs trail information to the integrated hazard prediction portion 10.

The control portion 1 determines YES in step A2 because the surveillance area is input in step A1 of FIG. 2 above. The control portion 1 performs the additional hazard prediction process in step A4. The control portion 1 allows the display portion 31 to display a menu of caution items corresponding to the surveillance area specified as the input information in step B1 of FIG. 3.

Figure 14:
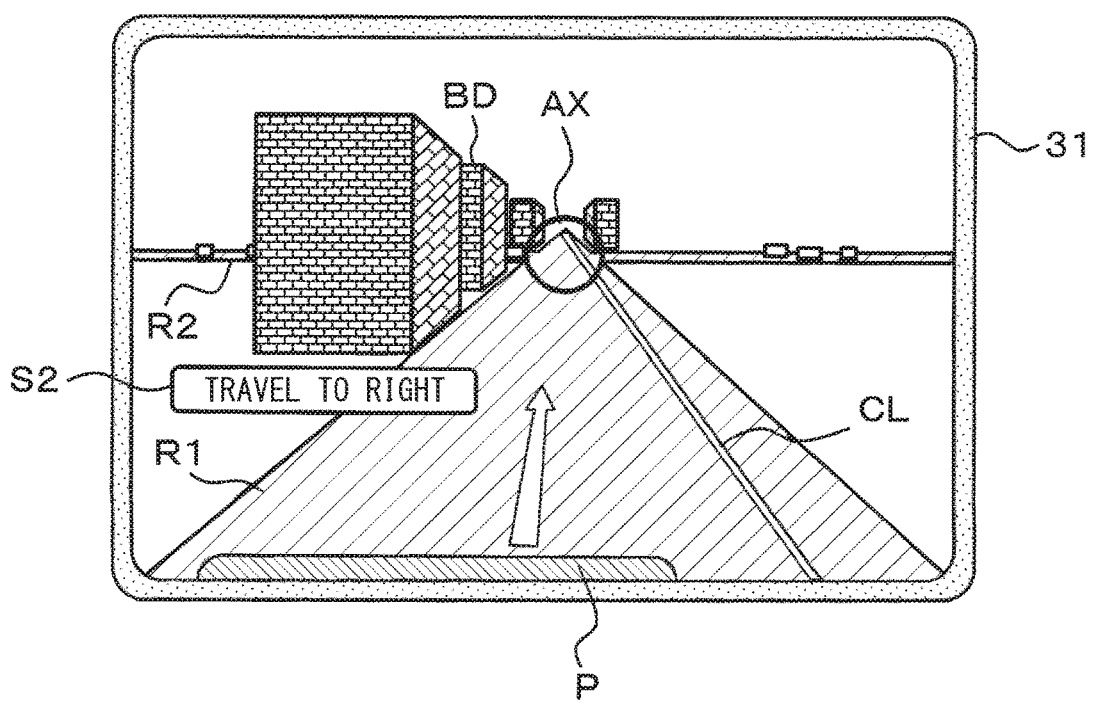
FIG. 14 illustrates a display screen for the first case (part 4)

The display portion 31 displays four caution items such as "watch for emerging objects" S1, "travel to the right" S2, "slow" S3, and "human figure found" S4 corresponding to the surveillance area at the intersection to the bottom right of the display portion 31. When user US touches "travel to the right" S2, the control portion 1 recognizes this according to YES in step B3 of FIG. 3, leaves "travel to the right" S2, and dismisses the other caution items S1, S3, and S4 from the display as illustrated in FIG. 14.

Figure 15:
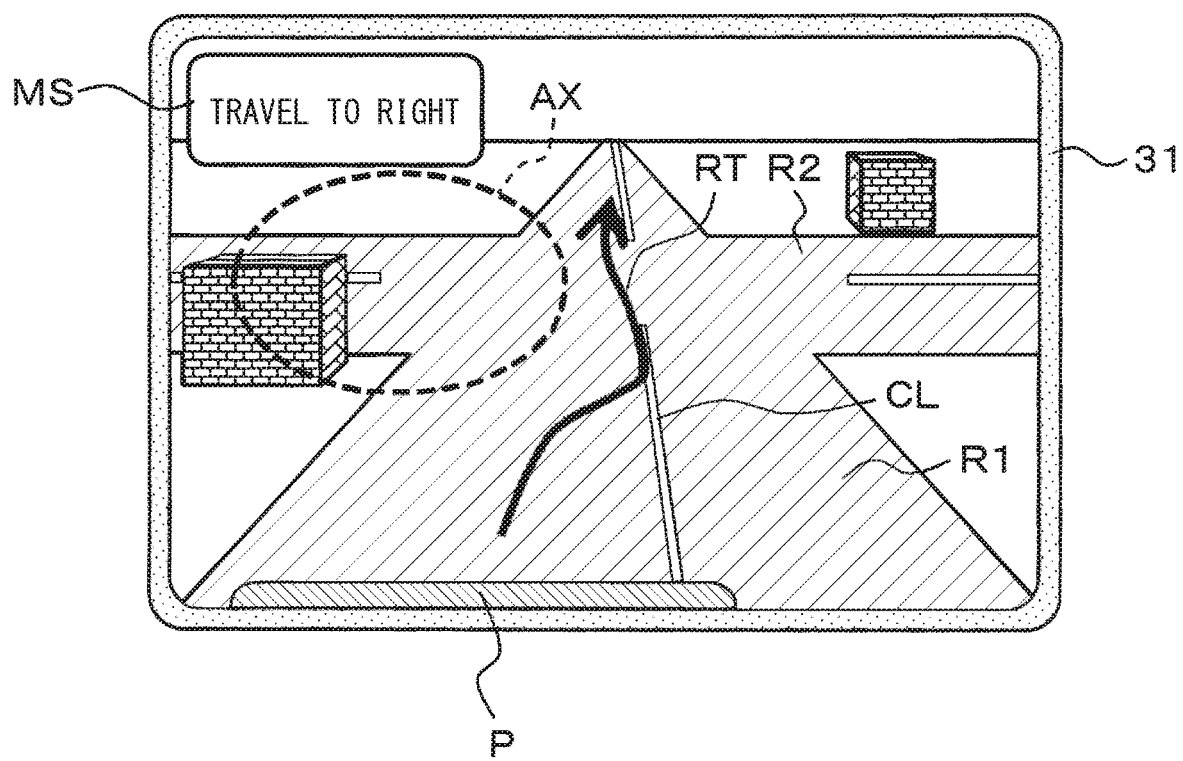
FIG. 15 illustrates a display screen for the first case (part 5)

The control portion 1 accordingly issues a directive from the integrated hazard prediction portion 10 to the vehicle control portion 19 so that the automatic operation reflects the above-described specification. As illustrated in FIG. 15, the control portion 1 displays message MS such as "travel to the right" and indicates that subject vehicle P travels to the right, namely, toward centerline CL near intersection AX as illustrated with thick solid line RT.

The control portion 1 performs the control setup process on the caution item in step B4 of FIG. 3. In this case, the control portion 1 performs the process based on the flowchart in FIG. 9 as a specific representation of the flowchart in FIG. 4. In step C1a, the control portion 1 assigns the normal hazard prediction with the "left side of the intersection ahead" as a surveillance area, namely, user-selected input information, and accepts selection items corresponding to the four caution items.

In step C2a, the control portion 1 sets an instruction as input, namely, "travel to the right" S2 as a user-selected caution item. The control portion 1 then sets control items, namely, "slow" as the vehicle control performed under the normal automatic operation control during an approach to intersections and "travel to the right" as the user-selected data.

In step C4, the control portion 1 determines whether there is available a real-time response to the set control item. If the result is NO and no response is available, the control portion 1 proceeds to step C5 and waits until a predetermined time elapses. If no response is available after a lapse of the predetermined time, the control portion 1 determines YES in step C5 and proceeds to the normal hazard prediction process in step B8 above. If step C4 results in YES, the control portion 1 proceeds to step C6, allows the display portion 31 to display the beginning of the operation control, returns to the process in FIG. 3, and proceeds to step B7.

In step B7, the control portion 1 determines whether the detailed surveillance process for specified surveillance area AX enters an available range. Namely, the control portion 1 determines whether the targeted surveillance area enters a predetermined range and the detailed surveillance process is executable. If step B7 results in NO, the control portion 1 proceeds to step B8 and waits while performing the normal hazard prediction process. Until surveillance area AX enters a predetermined range, the control portion 1 performs another normal hazard prediction process that can be performed by the automatic hazard prediction processing portion 11.

If step B7 results in YES, the control portion 1 performs the process based on in FIG. 10 that illustrates the specific contents of the detailed surveillance process for surveillance areas and surveillance objects illustrated in FIG. 5. In step D1 of this process, the control portion 1 determines whether "intersection" as surveillance area AX is recognized in real time. The control portion 1 follows the above-described process, passes through step D5, reaches step D6a, and allows the display portion 31 to display "intersection" as surveillance area AX in the highlight color.

The control portion 1 proceeds to step D8 and determines whether the user-specified surveillance area/object is safe. If step D8 results in YES, the control portion 1 proceeds to step D9a and allows the display portion 31 to display the "intersection" area as user-specified surveillance area AX by changing the highlight color to safety color representing a safe state.

The user-specified surveillance area/object may indicate a large hazard level. In this case, the control portion 1 proceeds to step D10 and determines whether "intersection" as user-specified surveillance area AX indicates a large hazard level and subject vehicle P is highly likely to collide. The user-specified surveillance area/object may indicate a large hazard level and subject vehicle P may be highly likely to collide. In this case, the control portion 1 proceeds to step D11 and generates a hazard alarm.

The user-specified surveillance area AX "intersection" may not indicate a large hazard level and subject vehicle P may be less likely to collide. In this case, the control portion 1 proceeds to step D12a, generates a caution alarm, and calls attention to the user by changing the highlight color for "intersection" to caution color to be displayed on the display portion 31.

The control portion 1 then proceeds to step D13 and determines whether subject vehicle P passes through a hazardous surveillance area/object. If step D13 results in YES, this process terminates. If step D13 results in NO, the control portion 1 returns to step D3 and repeatedly performs the above-described process.

When the detailed surveillance process for the user-specified object in step B9 terminates as above, the control portion 1 terminates the additional hazard prediction process and again performs the hazard prediction process in FIG. 2.

Second Case

Figure 18:
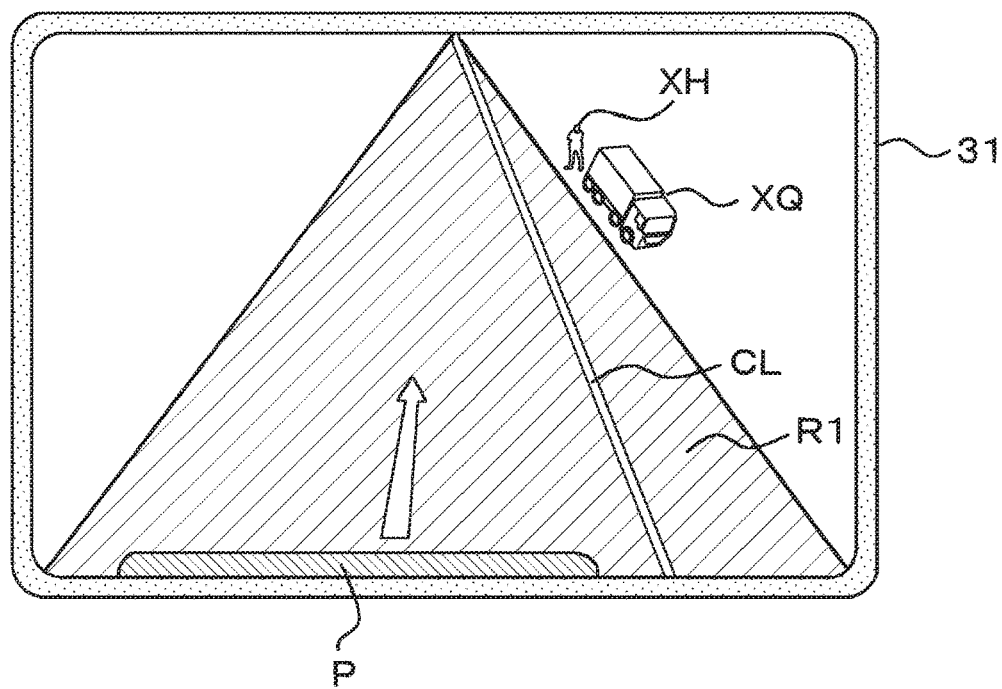
FIG. 18 illustrates a display screen for the second case (part 1)

The description below explains the second case where the driver recognizes a human figure near a vehicle stopping far in the travel direction of the subject vehicle and specifies the human figure as a surveillance object. FIG. 18 illustrates the second case. The user of subject vehicle P, such as a driver or a passenger, notices that track XQ stops at a road shoulder ahead on road R1 and human figure XH seems to exist behind. The user feels the necessity to pay attention to passing.

Figure 19:
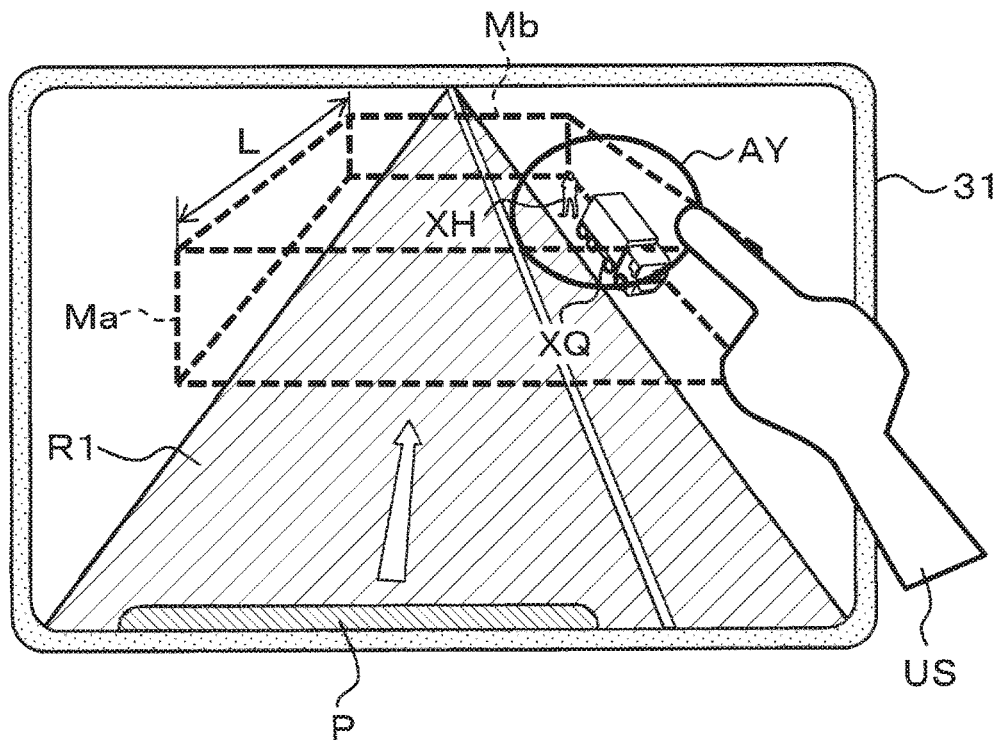
FIG. 19 illustrates a display screen for the second case (part 2)

In this case, as illustrated in FIG. 19, suppose the user selects surveillance area AY by swiping, with a finger, an area at the rear of track XQ displayed in the screen of the display portion 31. The user-specified surveillance area AY corresponds to stopped track XQ and applies to the specification of an area, not a moving object. The specified surveillance area AY is narrower than an area surveilled by the normal hazard prediction process.

As illustrated in FIG. 19, surveillance area AY is narrower than the normal surveillance applied to horizontal range Ma of road R1 limited by depth L. Since narrow area AY is specified, the surveillance process can be limited to this area AY as will be described later and the accuracy can be increased.

The control portion 1 retrieves a situation likely to cause a hazard from a traffic accident database, for example, based on a place attribute of swiped surveillance area AY and the placement of an object recognized from the image within surveillance area AY. After the range of swiped surveillance area AY is referenced in the map information, the captured image is used to determine that the specified place corresponds to the right side of the road (opposite lane) and a vehicle exists in surveillance area AY. Based on the object placement and the place information, the control portion 1 predicts a possible occurrence of hazard by using the traffic accident database.

Figure 20:
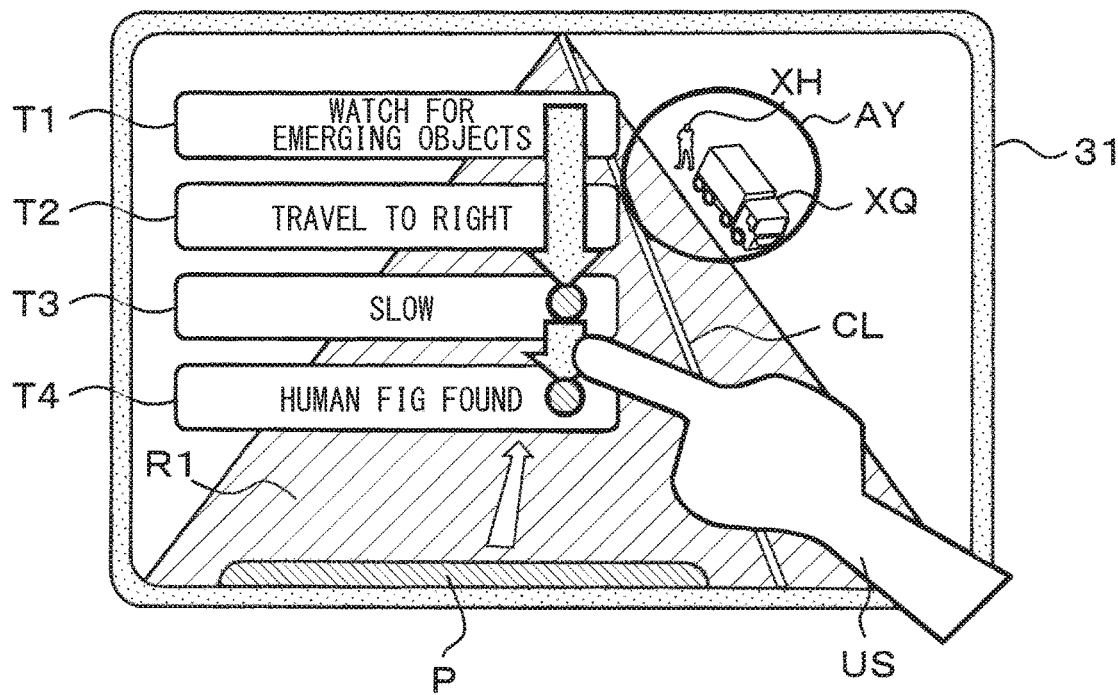
FIG. 20 illustrates a display screen for the second case (part 3)

The control portion 1 performs the additional hazard prediction process illustrated in FIG. 3 on condition that the hazard prediction process in FIG. 2 is performed and surveillance area AY is specified in step A2. In step B1 of FIG. 3, the control portion 1 allows the display portion 31 to display a menu of caution items and prompts the user to select caution items. For example, FIG. 20 illustrates four caution items such as "watch for emerging objects" T1 and "travel to the right" T2 on the assumption of anything emerging from the right of the road and "slow" T3 and "human figure found" T4 on the assumption of avoiding anything emerging.

Figure 16:
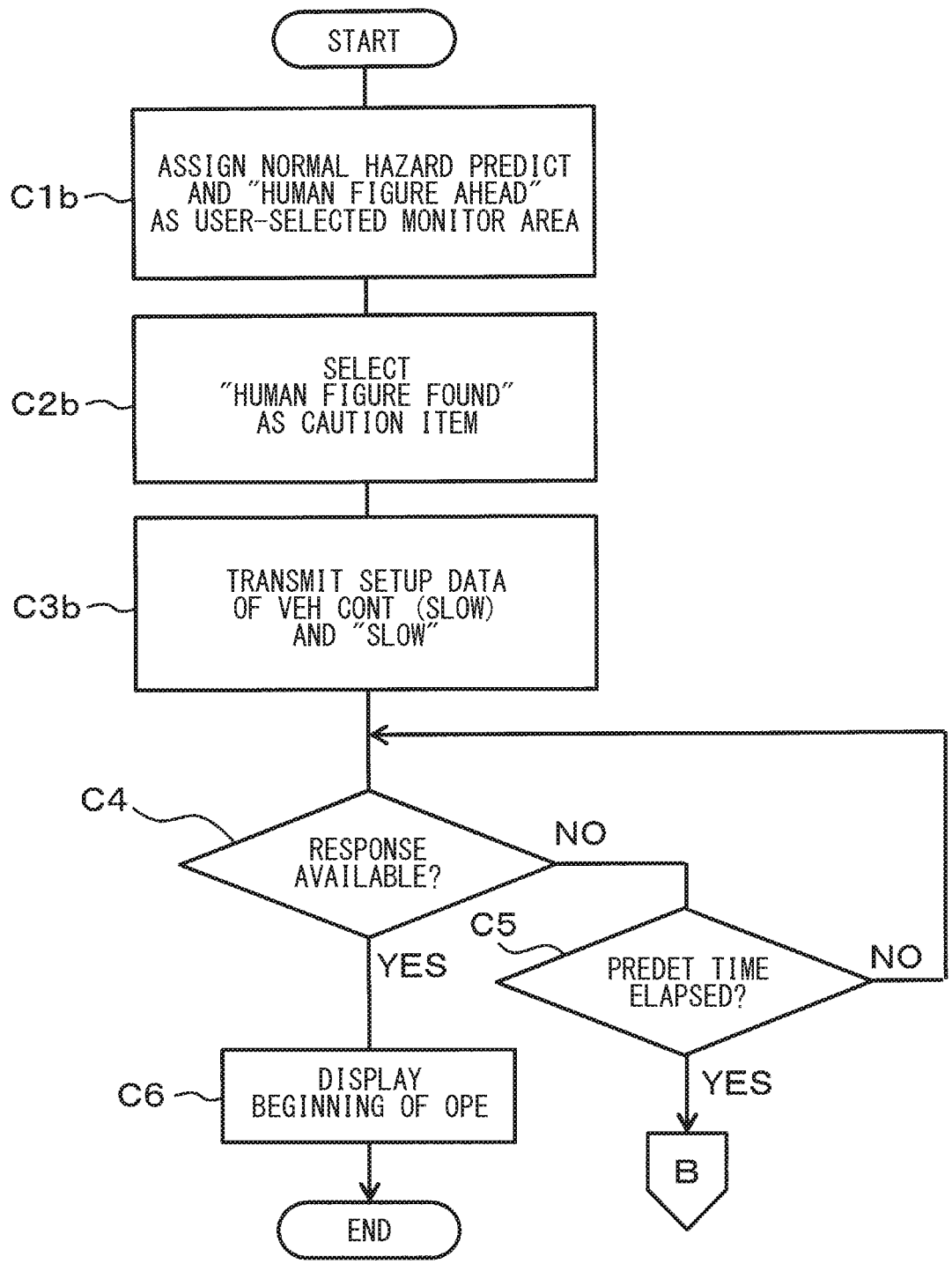
FIG. 16 is a flowchart illustrating a control setup process for caution items in a second case.
Figure 21:
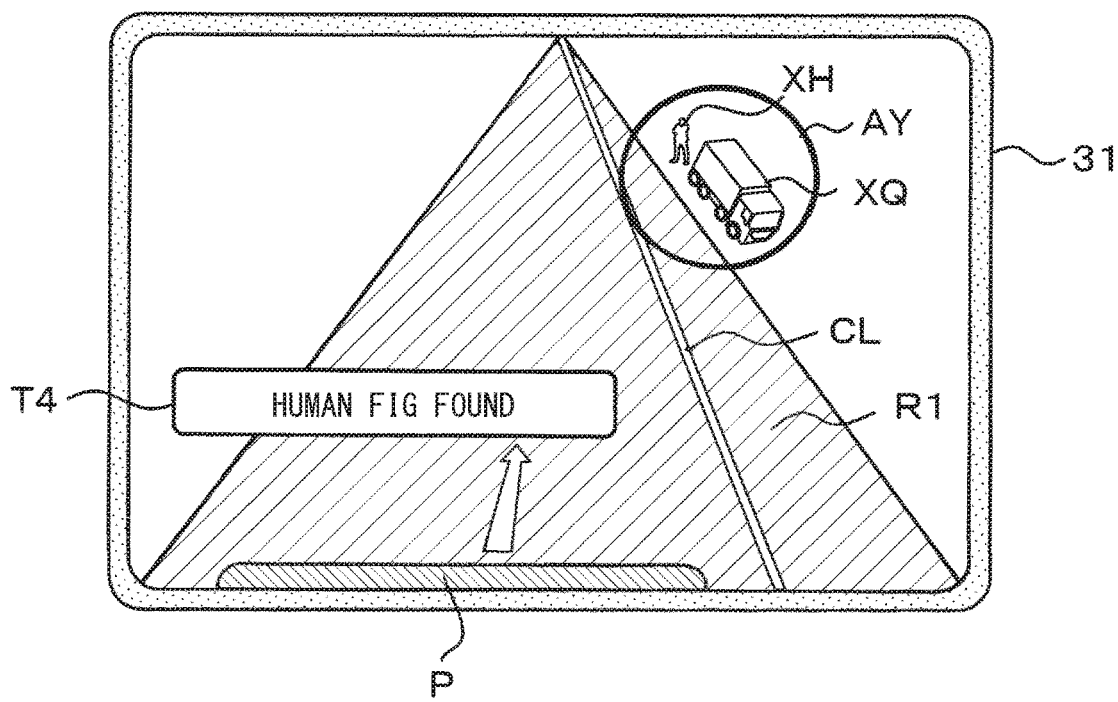
FIG. 21 illustrates a display screen for the second case (part 4)

FIG. 21 illustrates that the user performs touch manipulation, for example, to select "human figure found" T4 out of caution items T1 through T4 displayed on the display portion 31. The control portion 1 confirms the selection requested from the user after passing through steps B2 and B3, and then performs the control setup process on caution items in step B4 as illustrated in FIG. 16.

In step C1b, the control portion 1 selects information to be additionally controlled based on the information about two caution items T4 selected by the user and transmits the selected information to the automatic travel control system. In this case, the automatic operation system assigns the hazard prediction of "slow" to a predetermined surveillance area. Therefore, "human figure found" T4 is specified as an additional hazard prediction.

In step C2b, the control portion 1 directs the automatic travel control system to closely detect a pedestrian in user-specified surveillance area AY corresponding to the selection of "human figure found" T4 and specifies "slow" to avoid a hazard. In step C3b, the control portion 1 issues a directive to the automatic travel control system. In steps C4 and C5, the control portion 1 checks whether a response returns from the automatic travel control system to notify that the process is accepted.

Figure 22:
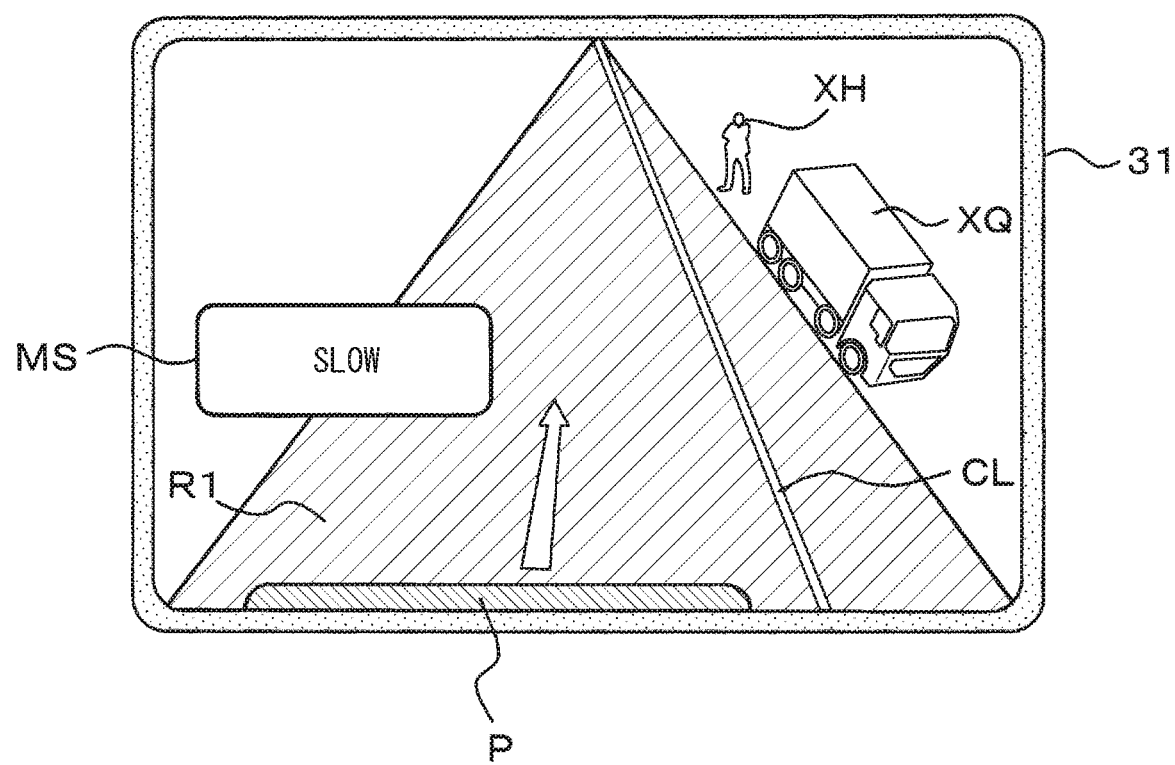
FIG. 22 illustrates a display screen for the second case (part 5)

If the automatic travel control system accepts the process, step C4 results in YES and the control portion 1 proceeds to step C6. As illustrated in FIG. 22, the control portion 1 allows the display portion 31 to display a message such as "slow" MS to notify the user that the hazard prediction process is accepted.

The control portion 1 may not be able to submit an additional request to the automatic travel control system even though the predetermined time has elapsed in the wait state after steps C4 and C6 above. In this case, the control portion 1 determines NO in step C6 to discard the additional request and notifies the user that an additional process is unavailable. The control portion 1 then returns to the normal hazard prediction process in step B8 of FIG. 3.

The description below explains the above-described process that is performed for surveillance area AY narrower than the normal surveillance area. As above, the automatic operation control detects a vehicle or an obstacle ahead on the traveled road by using the radar as a device to provide an obstacle detection function. The radar irradiates an electric wave to a travel path and measures a reflected wave to detect an object in an area where radar wave is irradiated.

The radar is limited to a measurable range and cannot measure a distant object because the intensity of a reflected wave attenuates. The radar scanning angle is limited. When the vehicle is too close to an object by the roadside, no electric wave is applied to the object and the distance cannot be measured. Therefore, the normal surveillance area is limited. This area corresponds to the range specified by area Ma and length L in depth illustrated in FIG. 19.

The radar can be replaced by the camera system 2 to measure the position and the distance to an object. When the camera of the camera system 2 is used, the quality of captured images depends on the intensity of light. The camera alone may hardly detect objects depending on situations.

According to the present configuration, the user can assign a "caution area" to a place difficult for the human visual recognition. When the user specifies surveillance area AY as a "caution area," caution area information is transmitted to the ECU of the automatic operation control. When no caution area is specified, the process is performed to detect objects evenly in the normal surveillance area.

According to the present embodiment, the touch panel 32 detects a touch point ("swipe" area) when the user touches or swipes the screen of the display portion 31. The control portion 1 can determine which point in the real space corresponds to the touch point. In this case, the control portion 1 performs image processing to convert a captured image into a still image, extracts an outline, extracts features of an object, and determines to which category the objects belong, based on the outline shape.

When an image for the user-specified surveillance area is unclear, the control portion 1 performs image processing for detailed analysis by increasing the resolution or magnification of an image in the surveillance area, correcting the brightness, or adjusting the focus setting so that an outline extraction process can be facilitated. The accuracy to detect moving objects can be improved by increasing the frequency of applying the radar scan to the surveillance area to increase the accuracy to measure the object movement in the caution area.

Another method may increase the accuracy of measuring the right and the left by providing an auxiliary radar in addition to the main radar to detect objects on major roads to be able to measure the right and the left of the vehicle even when the major radar is incapable of measurement. An infrared camera can provide the temperature distribution of a detected object, improving the accuracy of detecting a pedestrian based on an image corresponding to the face of the pedestrian.

Figure 17:
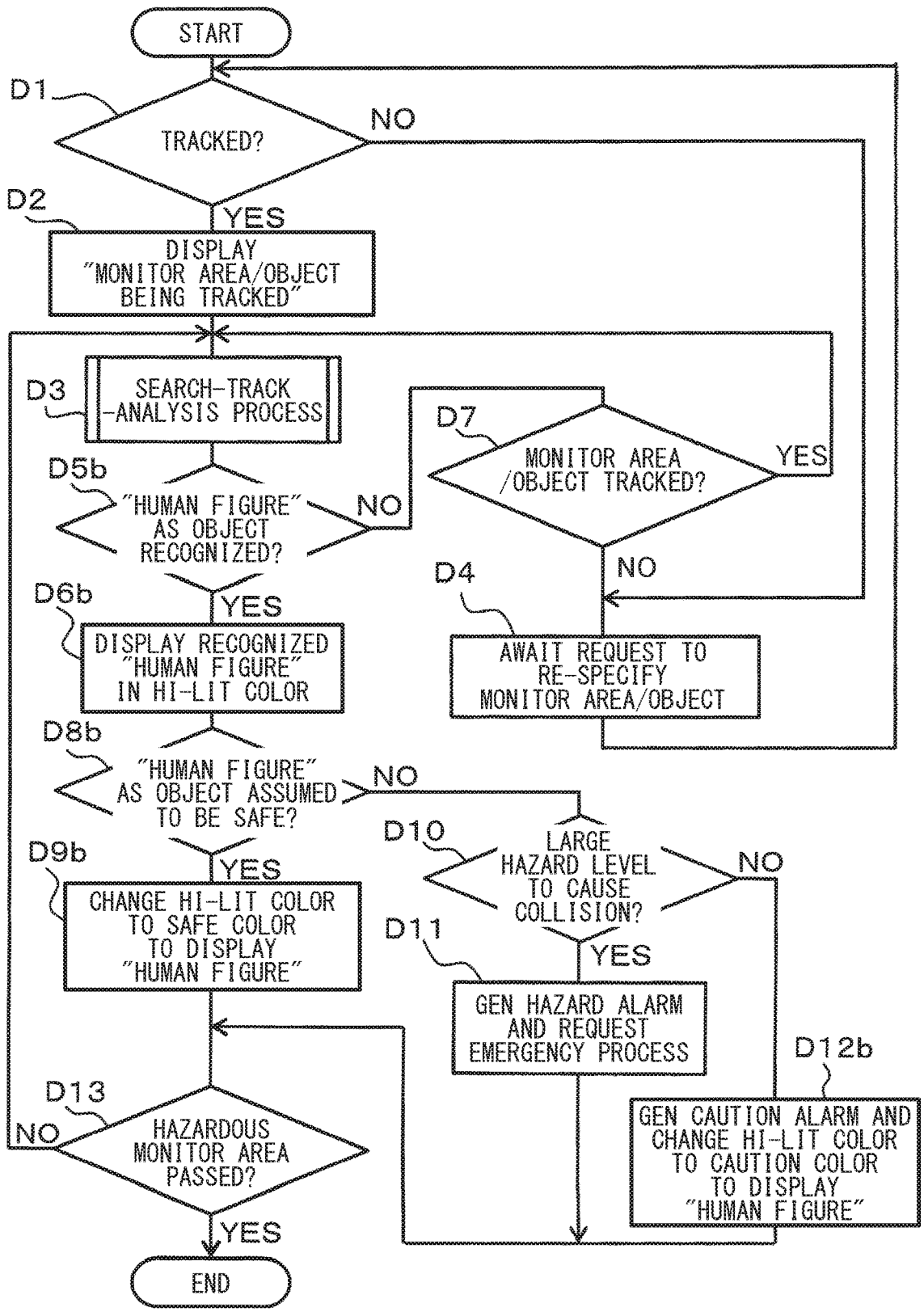
FIG. 17 is a flowchart illustrating a detailed surveillance process for a group of specified objects in the second case.

With reference to FIG. 17, the description below explains the detailed surveillance process on user-specified objects. In step D1 of FIG. 17, the control portion 1 determines whether a user-specified surveillance area AY is trailed. If the result is YES, the control portion 1 allows the display portion 31 to display "surveillance area/object being trailed." If surveillance area AY is not trailed, the control portion 1 proceeds to step D4 and prompts the user to re-specify an area and waits until the area is re-specified.

In step D3, the control portion 1 performs the search-trail-analysis process on surveillance area AY. The control portion 1 performs the search-trail-analysis process based on the flowchart illustrated in FIG. 6 above and a description is omitted for simplicity.

In step D5b, the control portion 1 determines whether human figure XH as a user-specified object is recognized. If human figure XH is recognized, the control portion 1 proceeds to step D6b and allows the display portion 31 to display recognized human figure XH in highlight color. If human figure XH is not recognized, the control portion 1 performs the process as above.

The control portion 1 then proceeds to step D8b and determines whether user-specified human figure XH is safe. If the result is YES, the control portion 1 proceeds to step D9 and allows the display portion 31 to display user-specified human figure XH by changing the highlight color to safety color representing a safe state.

User-specified human figure XH as an object existing in the surveillance area may indicate a high hazard level. In this case, the control portion 1 determines NO in step D8b. The control portion 1 proceeds to step D10 and determines whether human figure XH indicates a high hazard level and is highly likely to collide with subject vehicle P. If user-specified human figure XH is highly likely to collide, the control portion 1 proceeds to step D11 from step D10 and generates a hazard alarm. The automatic travel system may not start the emergency process even though the hazard level is high. In this case, the control portion 1 requests an emergency process and prompts the user to enter information.

User-specified human figure XH may not indicate a high hazard level and may be less likely to collide. In this case, the control portion 1 proceeds to step D12b from step D10, generates a caution alarm, and calls attention to the user by changing the display state to caution color used for user-specified human figure XH displayed on the display portion 31.

The control portion 1 then proceeds to step D13 and determines whether subject vehicle P passes through a hazardous surveillance area/object. If the result is YES, this process terminates. If step D13 results in NO, the control portion 1 returns to step D3 and repeatedly performs the above-described process.

Third Case

Figure 25:
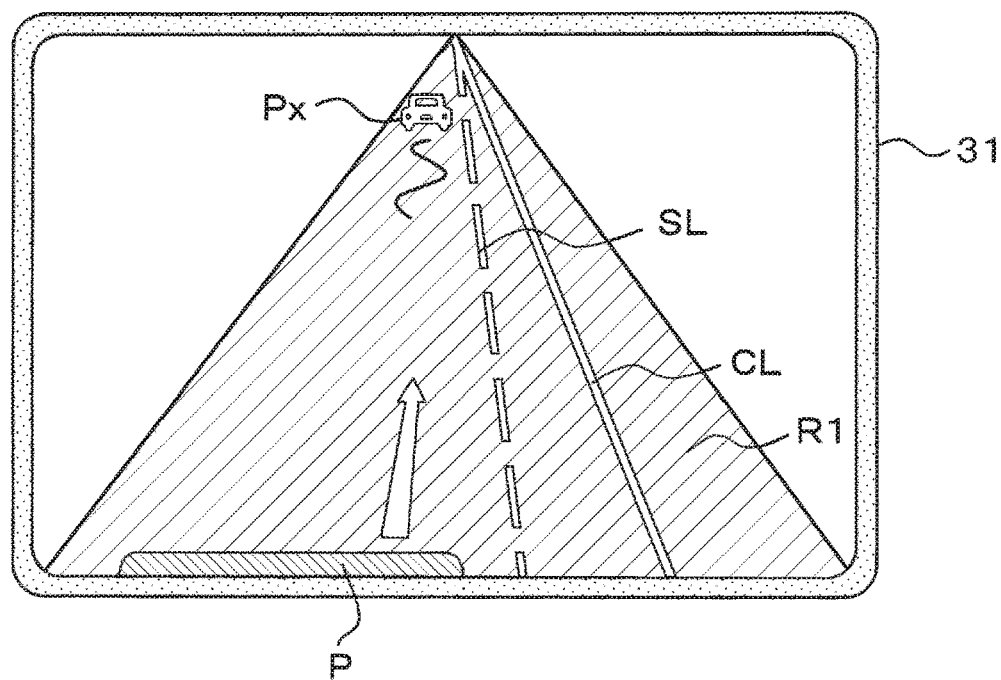
FIG. 25 illustrates a display screen for the third case (part 1)

The description below explains the third case where the driver finds a dangerous vehicle weaving far in the travel direction of the subject vehicle. FIG. 25 illustrates the third case. Forward vehicle Px dangerously travels four-lane road R1 ahead. The user of subject vehicle P needs to travel to avoid a hazard resulting from forward vehicle Px.

Figure 26:
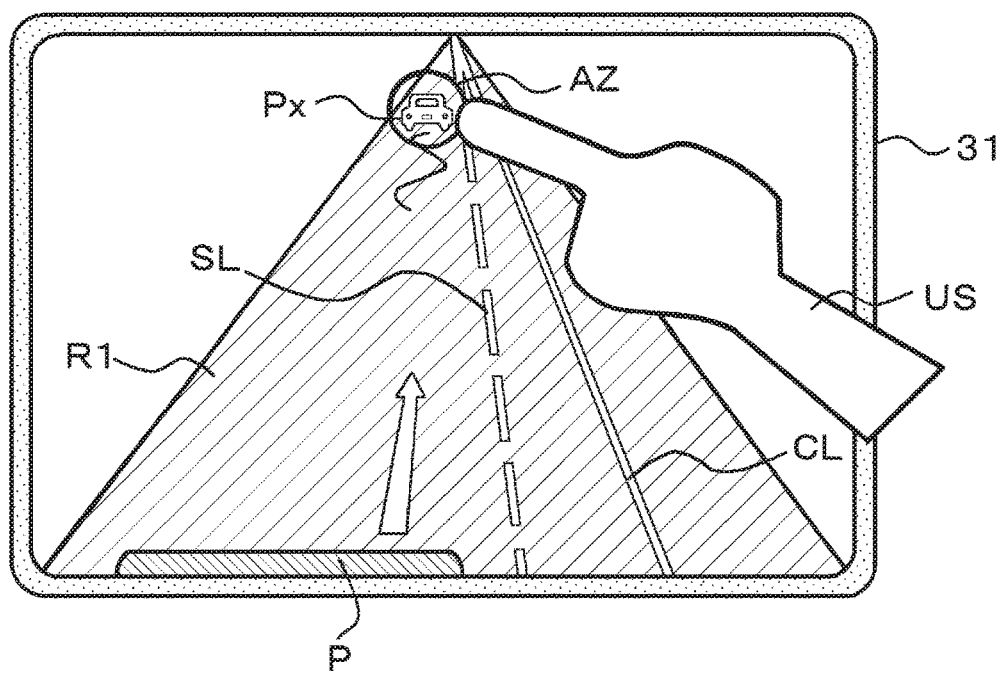
FIG. 26 illustrates a display screen for the third case (part 2)

As illustrated in FIG. 26, forward vehicle Px weaves right and left on the left lane. The user can select surveillance area AZ by swiping an area of forward vehicle Px displayed on the screen of the display portion 31.

Based on the information from the touch panel 32, the control portion 1 calculates the position of forward vehicle Px touched by the finger from the current position of subject vehicle P and the map information and determines the target position. The control portion 1 references map data for the determined target position and supplies the camera system 2 with a capture range to be focused. The control portion 1 allows the camera system 2 to increase the sensing accuracy for targeted surveillance area AZ by using the position information about forward vehicle Px. The control portion 1 internally records user-specified forward vehicle Px.

Figure 27:
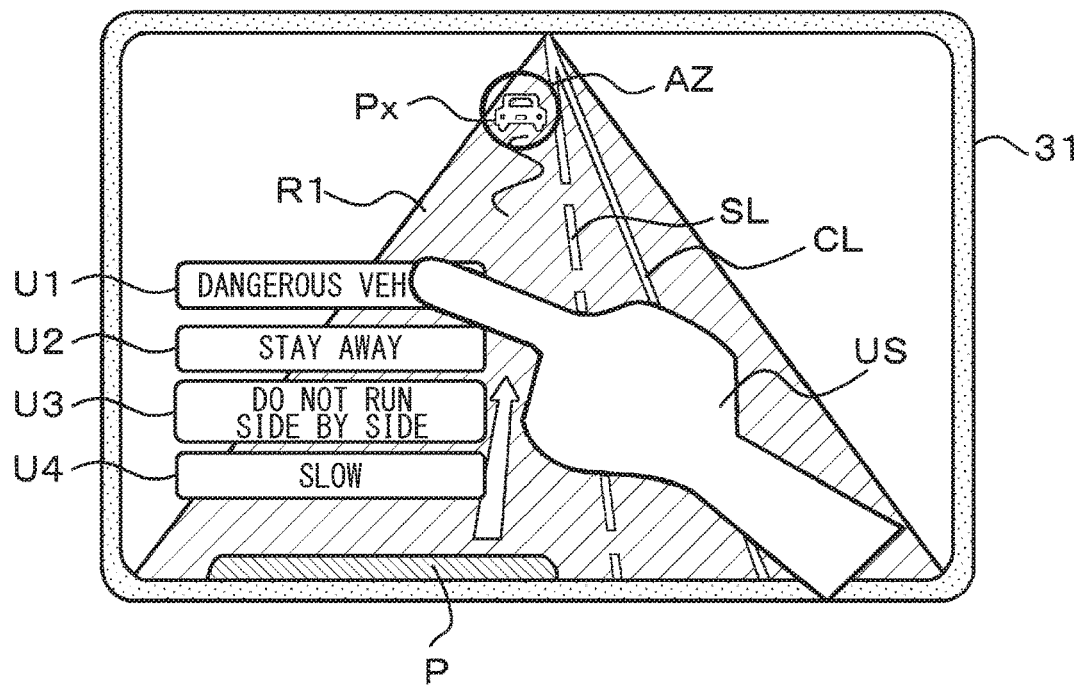
FIG. 27 illustrates a display screen for the third case (part 3)

The control portion 1 performs the additional hazard prediction process illustrated in FIG. 3 on the condition that the hazard prediction process illustrated in FIG. 2 is performed and forward vehicle Px is specified as a surveillance object in step A2. In step B1 of FIG. 3, the control portion 1 allows the display portion 31 to display a menu of caution items and prompts the user to select caution items. For example, FIG. 27 illustrates a menu containing four caution items such as "dangerous vehicle" U1, "stay away" U2, "do not run side by side" U3, and "slow" U4. In this case, the notification portion 18 can simultaneously give an audible notification as well as the display on the display portion 31.

Figure 23:
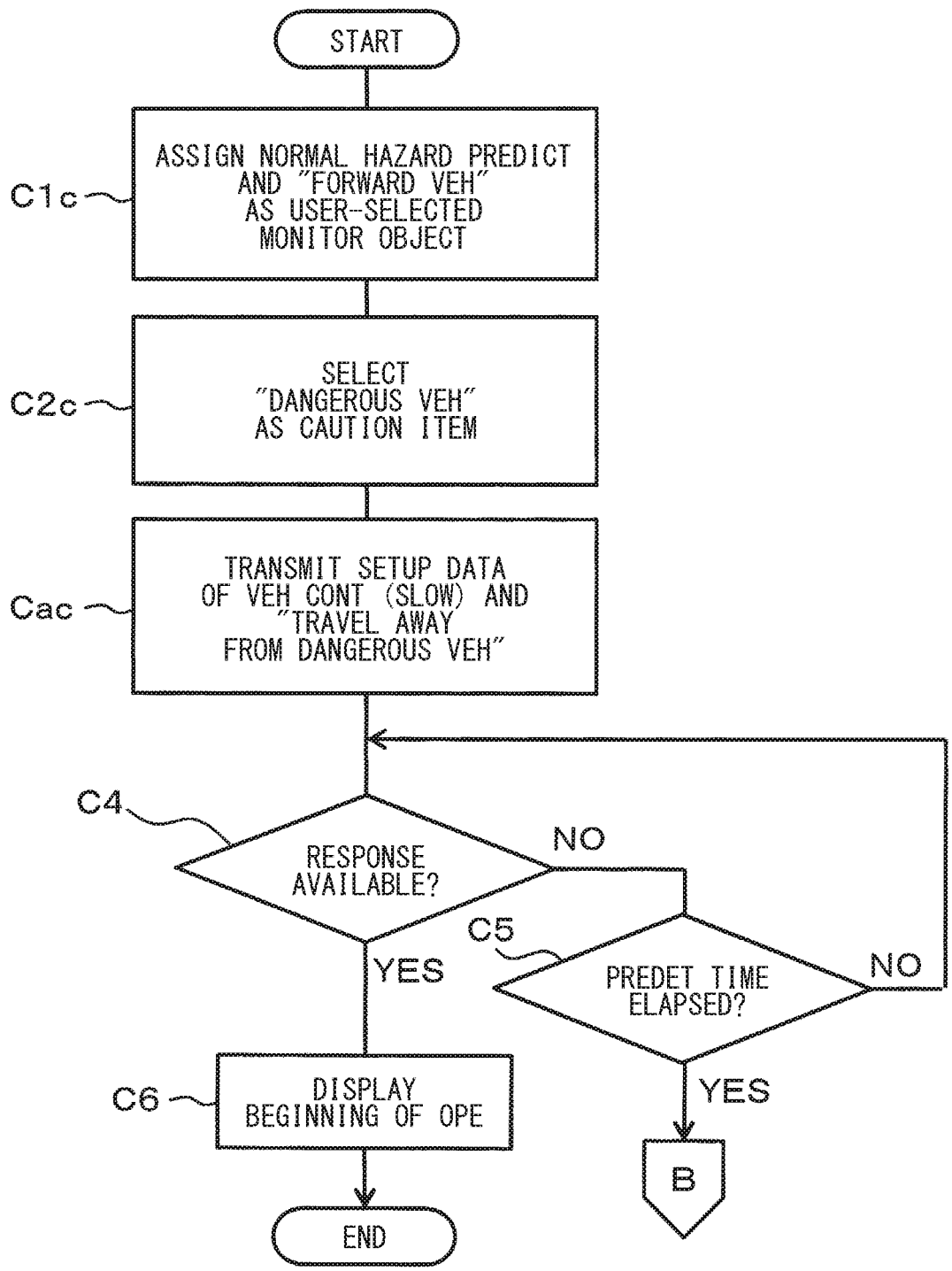
FIG. 23 is a flowchart illustrating a control setup process for caution items in a third case.
Figure 28:
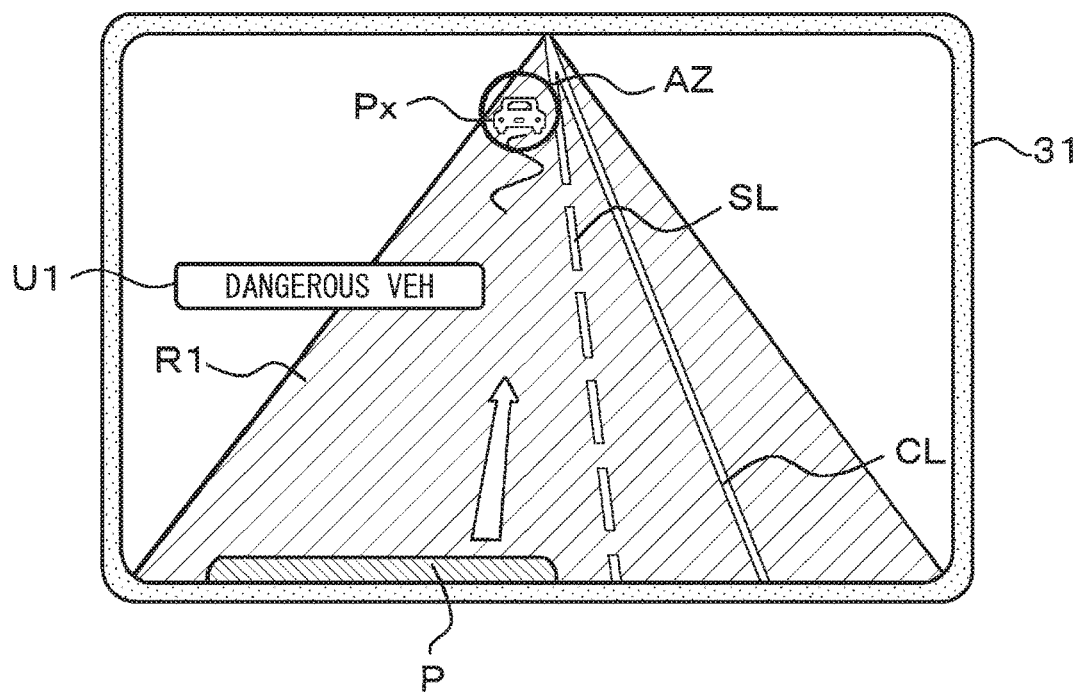
FIG. 28 illustrates a display screen for the third case (part 4)

FIG. 28 illustrates that the user performs touch manipulation, for example, to select "dangerous vehicle" U1 out of caution items U1 through U4 displayed on the display portion 31. The control portion 1 confirms the selection requested from the user after passing through steps B2 and B3, and then performs the control setup process on caution items in step B4 as illustrated in FIG. 23.

In step C1c, the control portion 1 selects information to be additionally controlled based on the information about user-selected caution item U1 and transmits the selected information to the automatic travel control system. In this case, the automatic operation system causes no hazard prediction in the predetermined surveillance area and responds to "dangerous vehicle" U1 specified as an additional hazard prediction.

In step C2c, the control portion 1 selects "dangerous vehicle" U1. In step C3c, the control portion 1 directs the automatic travel control system to set "travel away from the dangerous vehicle" as a travel mode. In steps C4 and C5, the control portion 1 checks whether a response returns from the automatic travel control system to notify that the process is accepted.

Figure 29:
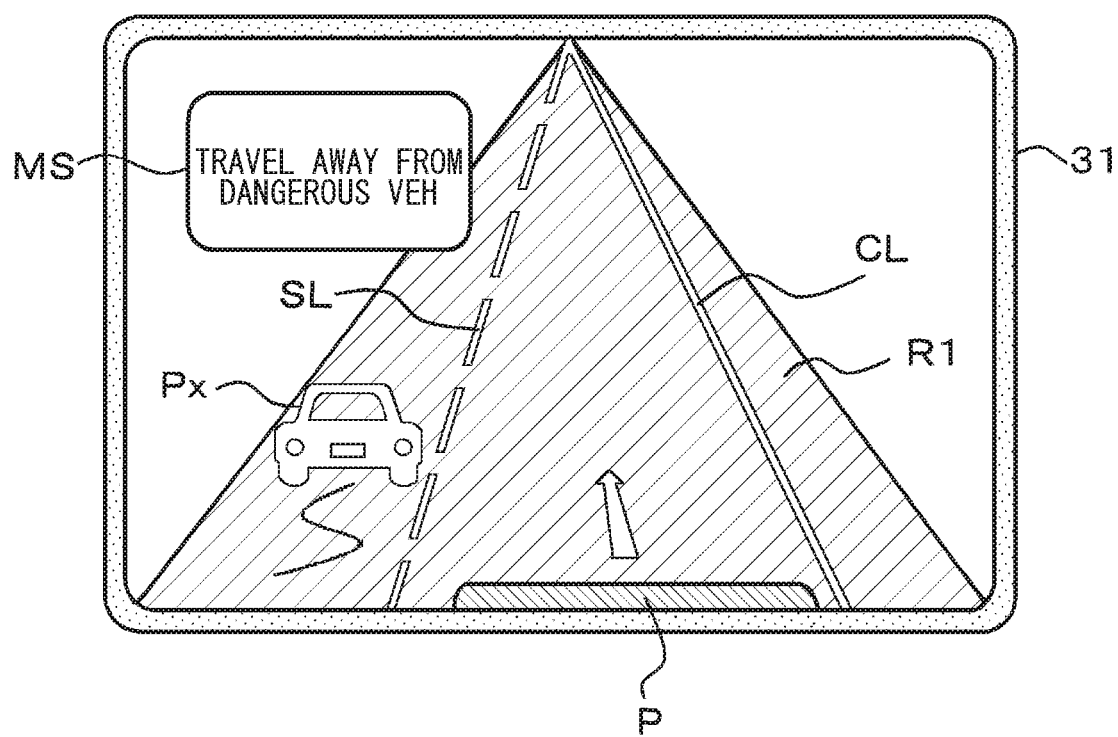
FIG. 29 illustrates a display screen for the third case (part 5)
Figure 30:
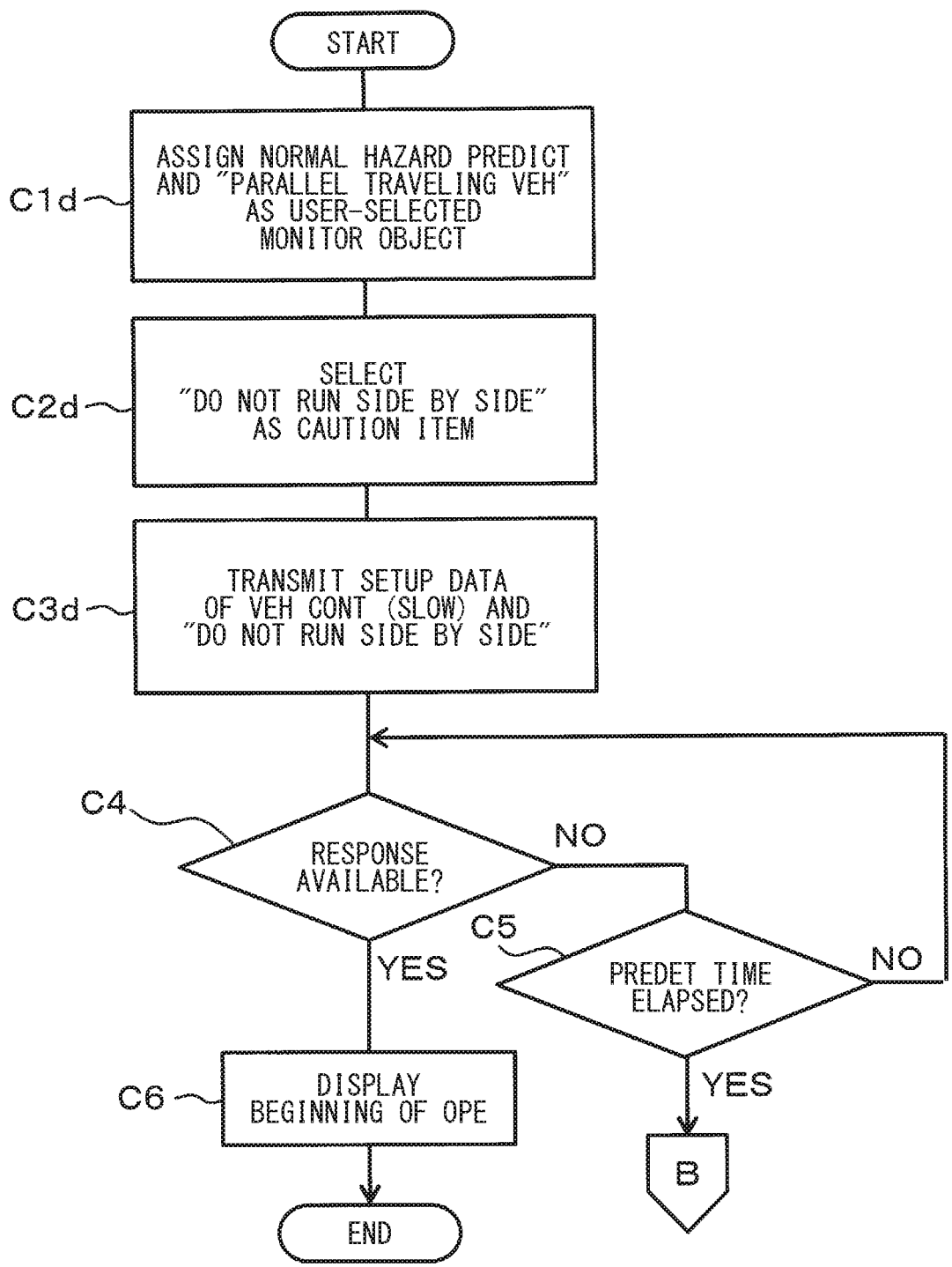
FIG. 30 is a flowchart illustrating a control setup process for caution items in a fourth case.

If the automatic travel control system accepts the process, step C4 results in YES and the control portion 1 proceeds to step C6. As illustrated in FIG. 29, the control portion 1 allows the display portion 31 to display message MS such as "travel away from the dangerous vehicle" to notify the user that the hazard prediction process is accepted.

Forward vehicle Px weaves the left lane. In this case, subject vehicle P is controlled to travel the right lane separated by lane line SL and travel away from forward vehicle Px as the "dangerous vehicle," making it possible to avoid a hazardous state.

The control portion 1 may not be able to submit an additional request to the automatic travel control system even though the predetermined time has elapsed in the wait state after steps C4 and C6 above. In this case, the control portion 1 determines NO in step C6 to discard the additional request and notifies the user that an additional process is unavailable. The control portion 1 then returns to the normal hazard prediction process in step B8 of FIG. 3.

Figure 24:
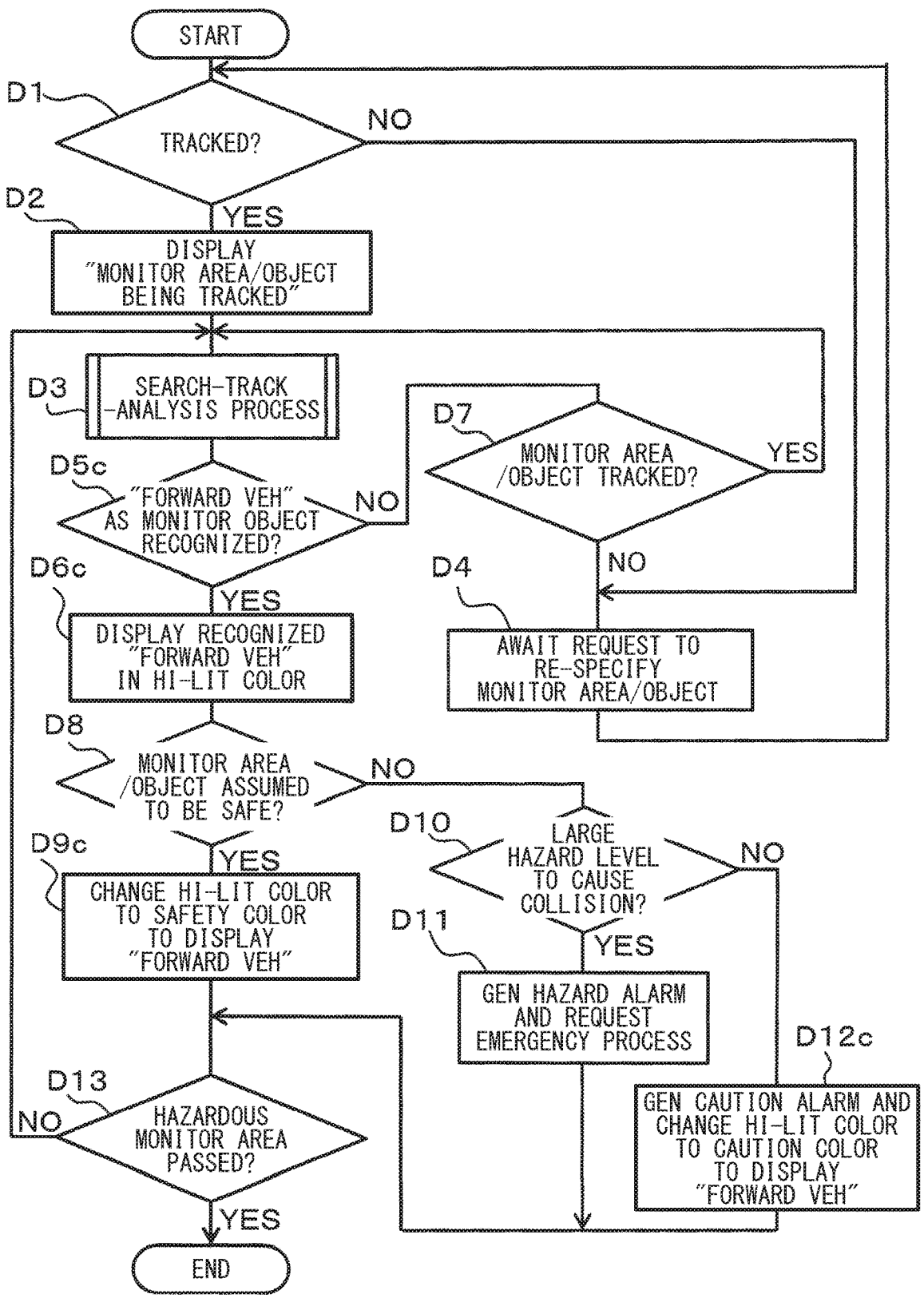
FIG. 24 is a flowchart illustrating a detailed surveillance process for a group of specified objects in the third case.

With reference to FIG. 24, the description below explains the detailed surveillance process on forward vehicle Px as a user-specified object described above. In step D1 of FIG. 24, the control portion 1 determines whether a user-specified surveillance area AZ is trailed. If the result is YES, the control portion 1 allows the display portion 31 to display "surveillance area/object being trailed." If surveillance area AY is not trailed, the control portion 1 proceeds to step D4 and prompts the user to re-specify an area and waits until the area is re-specified.

In step D3, the control portion 1 performs the search-trail-analysis process on surveillance area AZ. The control portion 1 performs the search-trail-analysis process based on the flowchart illustrated in FIG. 6 above and a description is omitted for simplicity.

In step D5c, the control portion 1 determines whether forward vehicle Px as a user-specified object is recognized. If forward vehicle Px is recognized, the control portion 1 proceeds to step D6c and allows the display portion 31 to display recognized forward vehicle Px in highlight color. If forward vehicle Px is not recognized, the control portion 1 performs the process as above.

The control portion 1 then proceeds to step D8c and determines whether user-specified forward vehicle Px is safe. If the result is YES, the control portion 1 proceeds to step D9 and allows the display portion 31 to display user-specified forward vehicle Px by changing the highlight color to safety color representing a safe state.

User-specified forward vehicle Px as an object existing in the surveillance area may indicate a high hazard level. In this case, the control portion 1 determines NO in step D8c. The control portion 1 proceeds to step D10 and determines whether forward vehicle Px indicates a high hazard level and is highly likely to collide with subject vehicle P. If user-specified forward vehicle Px is highly likely to collide, the control portion 1 proceeds to step D11 from step D10 and generates a hazard alarm. The automatic travel system may not start the emergency process even though the hazard level is high. In this case, the control portion 1 requests an emergency process and prompts the user to enter information.

User-specified forward vehicle Px may not indicate a high hazard level and may be less likely to collide. In this case, the control portion 1 proceeds to step D12c from step D10, generates a caution alarm, and calls attention to the user by changing the display state to caution color used for user-specified forward vehicle Px displayed on the display portion 31.

The control portion 1 then proceeds to step D13 and determines whether subject vehicle P passes through a hazardous surveillance area/object. If the result is YES, this process terminates. If step D13 results in NO, the control portion 1 returns to step D3 and repeatedly performs the above-described process.

When subject vehicle P approaches forward vehicle Px specified as a "dangerous vehicle," a conventional hazard avoidance process may assume this situation to be even "safe," for example. However, the user specification of the "dangerous vehicle" is added to perform the hazard prediction and makes it possible to provide the hazard avoidance control that gives a caution of "stay away."

Fourth Case

The fourth case is assumed below. Though not displayed on the display portion 31, the user notices that a parallel traveling vehicle exists at the side of subject vehicle P and a driver of the parallel traveling vehicle uses a mobile phone, for example. The driver recognizes the parallel traveling vehicle as a surveillance object and specifies this vehicle as a dangerous vehicle.

Figure 32:
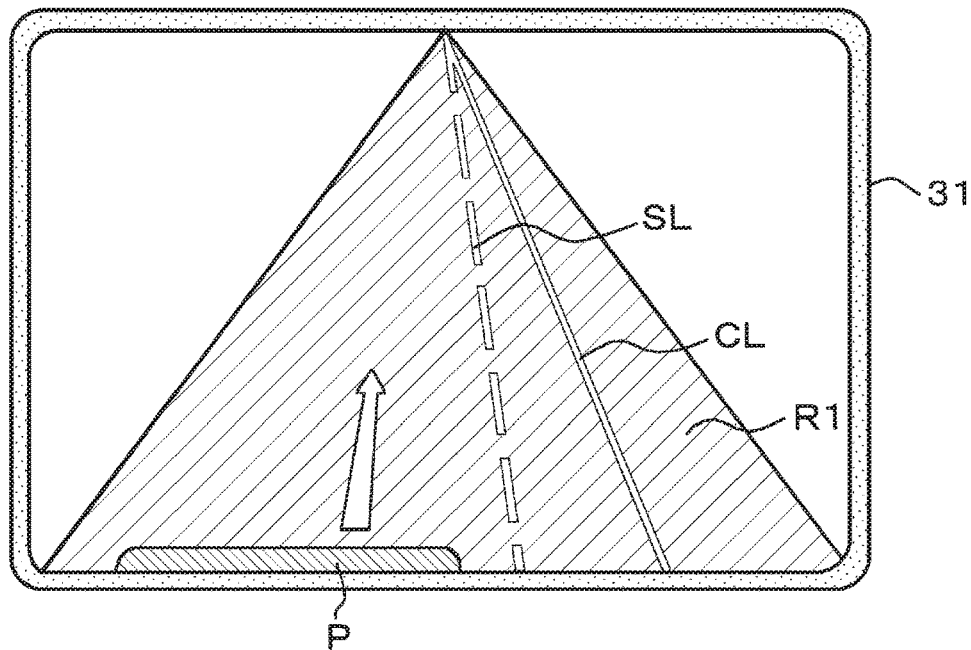
FIG. 32 illustrates a display screen for the fourth case (part 1)

FIG. 32 illustrates the fourth case. Subject vehicle P travels the left lane of four-lane road R1 separated by lane line SL. Parallel traveling vehicle Px (see FIG. 36) travels the right lane. It is supposed that the user of subject vehicle P notices that a driver of parallel traveling vehicle Px uses a mobile phone, for example, and does not look ahead. In this case, parallel traveling vehicle Px is not captured by the camera. Since no image is generated, parallel traveling vehicle Px cannot be directly specified as a surveillance object on the display portion 31.

Figure 33:
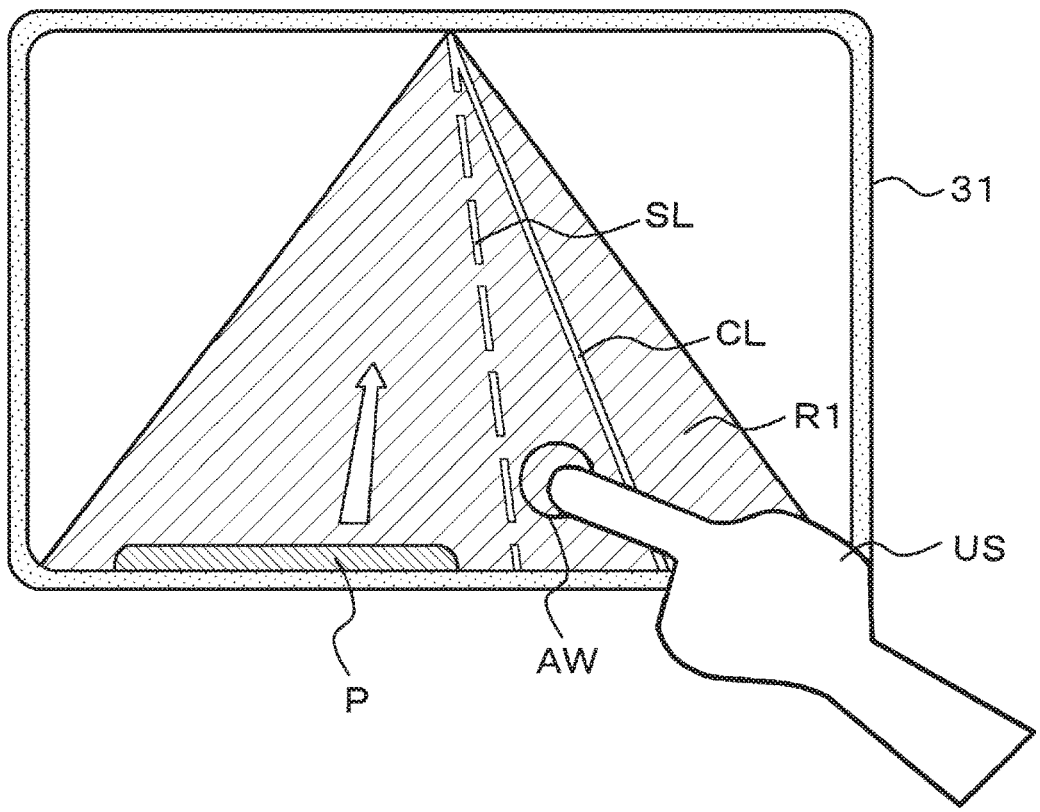
FIG. 33 illustrates a display screen for the fourth case (part 2)

In this case, as illustrated in FIG. 33, the user can specify parallel traveling vehicle Px on the display portion 31 by touching lateral area AW adjacent to subject vehicle P on the right lane where parallel traveling vehicle Px exists. In response to the information from the touch panel 32, the control portion 1 calculates the position of parallel traveling vehicle Px in lateral area AW touched by the finger and determines a target position based on the current position of subject vehicle P and the map information. The control portion 1 references map data corresponding to the determined target position and notifies the camera system 2 of a capture range to be focused. The control portion 1 allows the camera system 2 to increase the sensing accuracy by using the position information about parallel traveling vehicle Px. The control portion 1 internally records user-specified parallel traveling vehicle Px.

Figure 34:
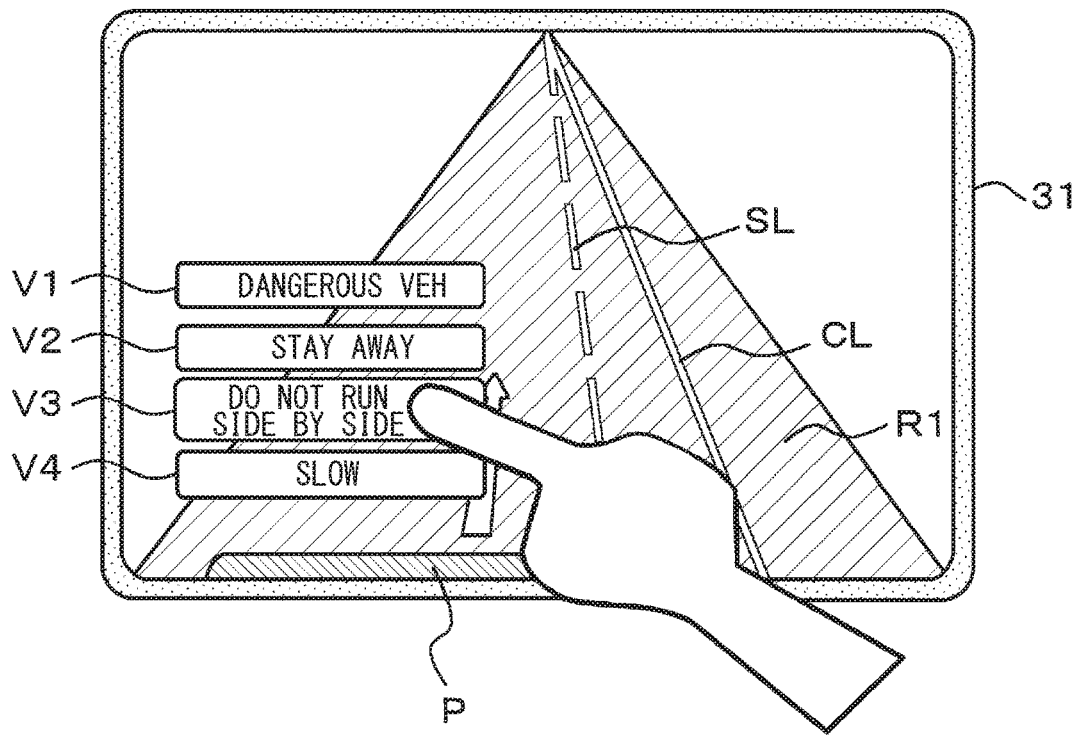
FIG. 34 illustrates a display screen for the fourth case (part 3)

The control portion 1 performs the hazard prediction process illustrated in FIG. 2. The control portion 1 performs the additional hazard prediction process illustrated in FIG. 3 on the condition that parallel traveling vehicle Px is specified as a surveillance object in step A2. In step B1 of FIG. 3, the control portion 1 allows the display portion 31 to display a menu of caution items and prompts the user to select caution items. For example, FIG. 34 illustrates a menu containing four caution items such as "dangerous vehicle" V1, "stay away" V2, "do not run side by side" V3, and "slow" V4 In this case, the notification portion 18 can simultaneously give an audible notification as well as the display on the display portion 31.

Figure 35:
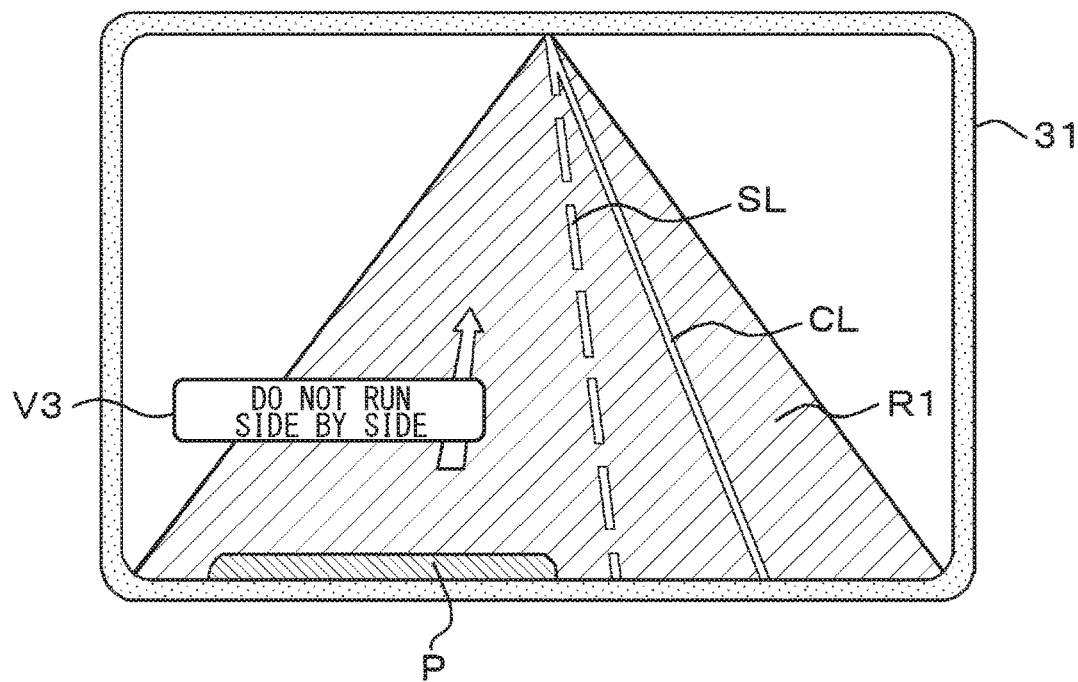
FIG. 35 illustrates a display screen for the fourth case (part 4)

FIG. 35 illustrates that the user performs touch manipulation, for example, to select "do not run side by side" V3 out of caution items V1 through V4 displayed on the display portion 31. The control portion 1 confirms the selection requested from the user after passing through steps B2 and B3, and then performs the control setup process on caution items in step B4 as illustrated in FIG. 35.

In step C1d, the control portion 1 selects information to be additionally controlled based on the information about user-selected caution item V3 and transmits the selected information to the automatic travel control system. In this case, the automatic operation system causes no hazard prediction in the predetermined surveillance area and responds to "do not run side by side" V3 specified as an additional hazard prediction.

In step C2d, the control portion 1 selects "do not run side by side" V3. In step C3d, the control portion 1 directs the automatic travel control system to set "do not run side by side" as a travel mode. In steps C4 and C5, the control portion 1 checks whether a response returns from the automatic travel control system to notify that the process is accepted.

Figure 36:
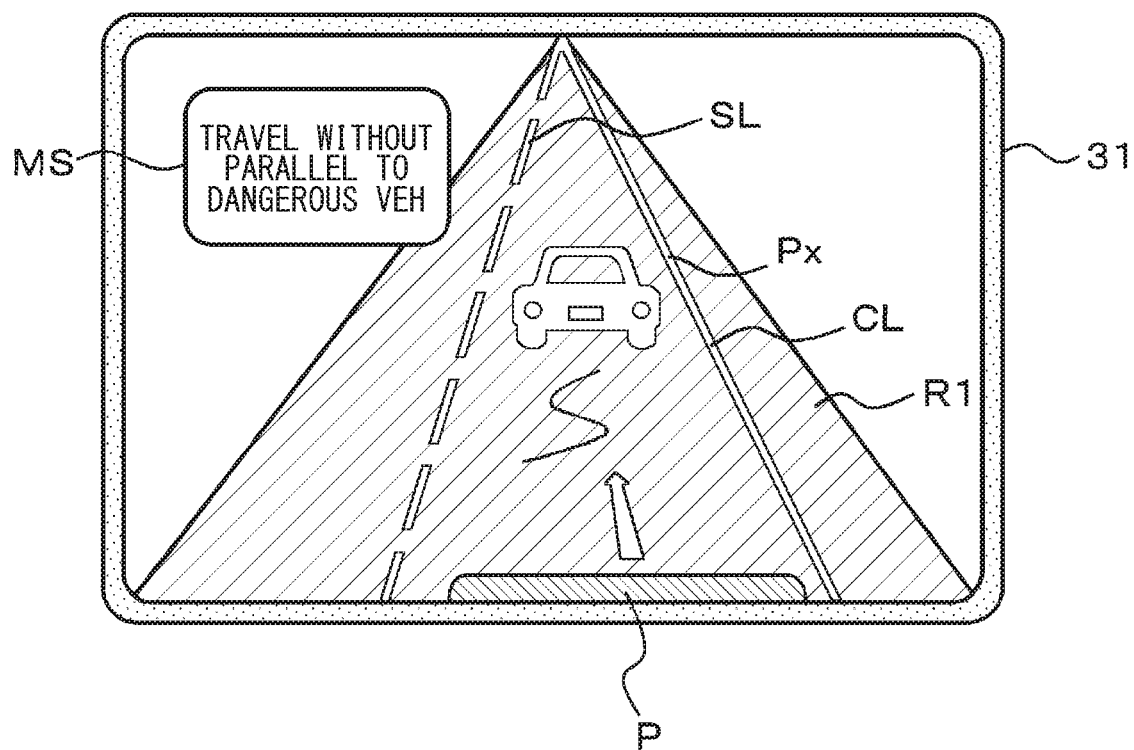
FIG. 36 illustrates a display screen for the third case (part 5)

If the automatic travel control system accepts the process, step C4 results in YES and the control portion 1 proceeds to step C6. As illustrated in FIG. 36, the control portion 1 allows the display portion 31 to display message MS such as "travel without parallel to the dangerous vehicle" to notify the user that the hazard prediction process is accepted.

The control portion 1 may not be able to submit an additional request to the automatic travel control system even though the predetermined time has elapsed in the wait state after steps C4 and C6 above. In this case, the control portion 1 determines NO in step C6 to discard the additional request and notifies the user that an additional process is unavailable. The control portion 1 then returns to the normal hazard prediction process in step B8 of FIG. 3.

Figure 31:
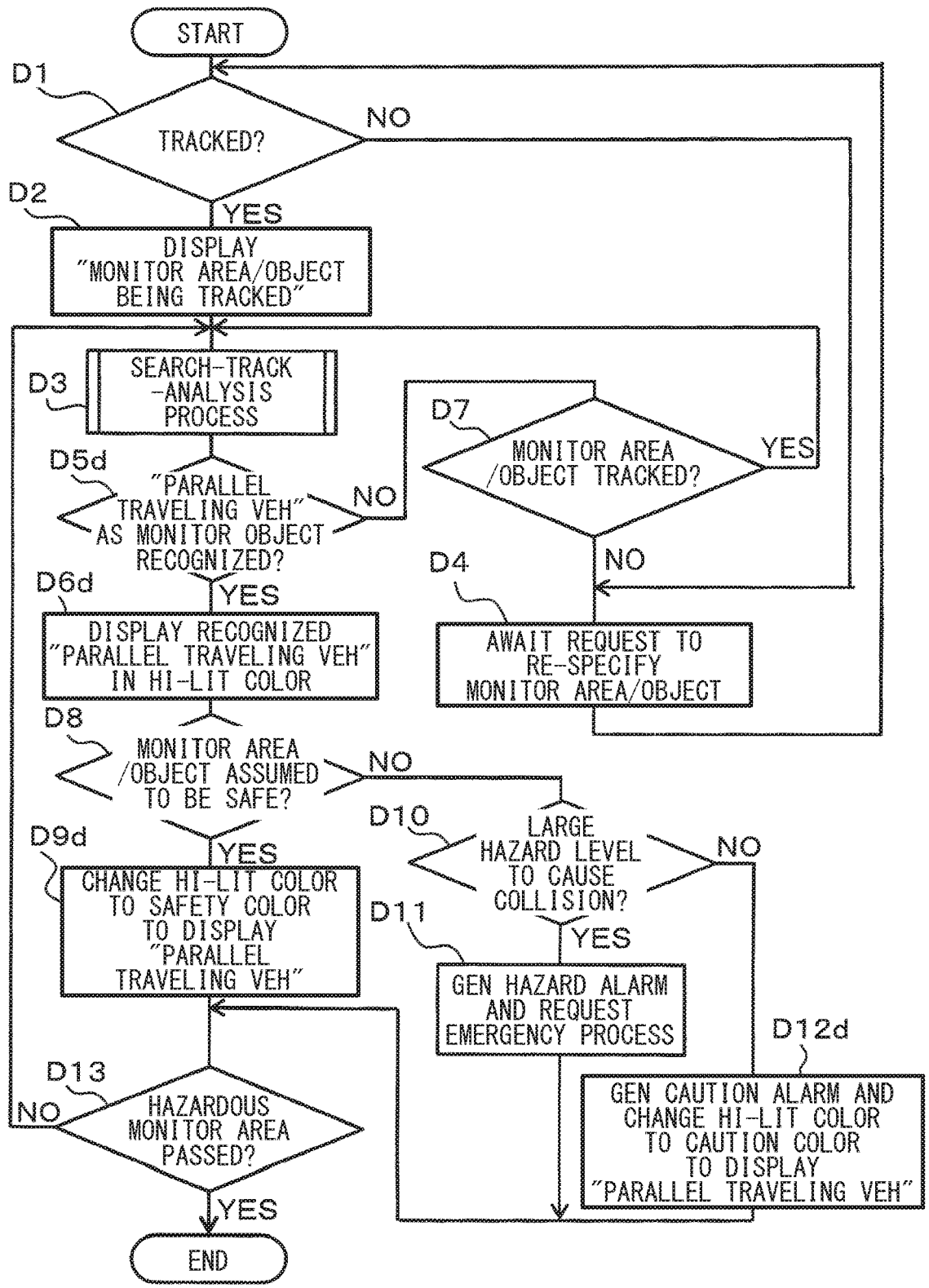
FIG. 31 is a flowchart illustrating a detailed surveillance process for a group of specified objects in the fourth case.

With reference to FIG. 31, the description below explains the detailed surveillance process on parallel traveling vehicle Px as a user-specified object described above. In step D1 of FIG. 31, the control portion 1 determines whether user-specified parallel traveling vehicle Px is trailed in surveillance area AW. If the result is YES, the control portion 1 allows the display portion 31 to display "surveillance area/object being trailed." If the result is YES, the control portion 1 allows the display portion 31 to display "surveillance area/object being trailed." If parallel traveling vehicle Px is not trailed, the control portion 1 proceeds to step D4 and prompts the user to re-specify an area and waits until the area is re-specified.

In step D3, the control portion 1 performs the search-trail-analysis process on parallel traveling vehicle Px. The control portion 1 performs the search-trail-analysis process based on the flowchart illustrated in FIG. 6 above and a description is omitted for simplicity.

In step D5d, the control portion 1 determines whether parallel traveling vehicle Px as a user-specified object is recognized. If parallel traveling vehicle Px is recognized, the control portion 1 proceeds to step D6*d* and allows the display portion 31 to display recognized parallel traveling vehicle Px in highlight color. If parallel traveling vehicle Px is not recognized, the control portion 1 performs the process as above.

The control portion 1 then proceeds to step D8*d* and determines whether user-specified parallel traveling vehicle Px is safe. If the result is YES, the control portion 1 proceeds to step D9 and allows the display portion 31 to display user-specified parallel traveling vehicle Px by changing the highlight color to safety color representing a safe state.

User-specified parallel traveling vehicle Px as an object existing in the surveillance area may indicate a high hazard level. In this case, the control portion 1 determines NO in step D8*c*. The control portion 1 proceeds to step D10 and determines whether parallel traveling vehicle Px indicates a high hazard level and is highly likely to collide with subject vehicle P. If user-specified parallel traveling vehicle Px is highly likely to collide, the control portion 1 proceeds to step D11 from step D10 and generates a hazard alarm. The automatic travel system may not start the emergency process even though the hazard level is high. In this case, the control portion 1 requests an emergency process and prompts the user to enter information.

User-specified forward vehicle Px may not indicate a high hazard level and may be less likely to collide. In this case, the control portion 1 proceeds to step D12*c* from step D10, generates a caution alarm, and calls attention to the user by changing the display state to caution color used for user-specified parallel traveling vehicle Px displayed on the display portion 31.

The control portion 1 then proceeds to step D13 and determines whether subject vehicle P passes through a hazardous surveillance area/object. If the result is YES, this process terminates. If step D13 results in NO, the control portion 1 returns to step D3 and repeatedly performs the above-described process.

The present embodiment provides the control portion 1 that enables the user to specify a surveillance area or a surveillance object while driving under the automatic operation control and performs an additional hazard avoidance process corresponding to the user-selected caution item.

The user can supplement the automatic operation system with a surveillance area or a surveillance object to be noticed while maintaining the states related to the driving. It is possible to provide a highly advanced automatic operation function.

It is possible to configure a framework in which the user can notify a "target to be noticed" to subject vehicle P under the automatic operation control provided by the user instead of being notified of the "target to be noticed." In other words, the user is essentially a driver. However, it is possible to configure a framework in which the user can also act as a passenger who uses the automatic operation control function as if someone else acted as a replacement driver. The user can notify (input) user-specified points to the replacement driver.

The user can appropriately get engaged in the driving during the automatic operation so that the user can appreciate a preferred safe driving state to ensure a feeling of relief. Besides, the user can maintain the consciousness of being engaged in driving.

OTHER EMBODIMENTS

There have been illustrated the configurations of providing the display device 3, the voice input portion 4, and the state detection device 5 as the information input portion. However, all of these need not be always provided but at least one of them can be provided.

There have been described the examples of providing the learning function by allowing the user input information storage portion 16 to store input information such as surveillance areas or surveillance objects specified by the user. However, the learning function can be provided as needed. Similarly, the automatic operation function can be improved as needed by exchanging information with the external information center 200 through the use of the wireless communication portion 17.

There has been illustrated the configuration of providing the display device 3 with the display portion 31 and the touch panel 32. However, the configuration may use a head-up display, for example, and import input information by detecting the operations or voice of the user.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes a plurality of sections (or steps), and each section is expressed as, for example, A1. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An autonomous driving assistance device comprising:
a normal avoidance processing portion that performs a hazard prediction based on a predetermined hazard avoidance condition and performs a hazard avoidance procedure during an autonomous driving operation of a vehicle;
an information input portion that receives user-input information about a driving operation of the vehicle;
a determination portion that checks area or object information input from the information input portion and determines the area or the object as a monitoring target;
a track portion that tracks the monitoring target;
an additional avoidance processing portion that sets at least one additional hazard avoidance procedure for the monitoring target, and performs the at least one additional hazard avoidance procedure in addition to the hazard avoidance procedure performed by the normal avoidance processing portion when the monitoring target tracked by the track portion approaches the vehicle; and a display portion that displays the at least one additional hazard avoidance procedure performed by the additional avoidance processing portion corresponding to the monitoring target input from the information input portion;

wherein:

the at least one additional hazard avoidance procedure includes a plurality of additional hazard avoidance procedures; and the additional avoidance processing portion controls the display portion to display the plurality of the additional hazard avoidance procedures, receives a selection from a user, and performs one of the plurality of the additional hazard avoidance procedures when the plurality of the additional hazard avoidance procedures corresponds to the monitoring target input from the information input portion.

2. The autonomous driving assistance device according to claim 1, wherein:

the track portion includes a camera to capture the monitoring target; and the track portion analyzes an image captured by the camera to track the monitoring target.

3. The autonomous driving assistance device according to claim 2, further comprising:

a map information provision portion that provides a current position of the vehicle as current position information in association with map information, wherein:

the track portion tracks the monitoring target with focusing on the monitoring target by setting a capture range of the camera corresponding to the monitoring target based on the current position information provided by the map information provision portion.

4. The autonomous driving assistance device according to claim 3, wherein:

the additional avoidance processing portion provides a second accurate additional hazard avoidance procedure that is more accurate than the at least one additional hazard avoidance procedure based on information about the monitoring target with tracking and focusing on the monitoring target by the track portion.

5. The autonomous driving assistance device according to claim 1, wherein:

the display portion includes a touch panel that inputs the monitoring target by touching a screen of the touch panel.

6. The autonomous driving assistance device according to claim 1, further comprising:

a storage portion that stores, as learning information, the user-input information relating to the driving operation of the vehicle, wherein:

the additional avoidance processing portion sets a previous monitoring target determined based on the learning information stored in the storage portion as the monitoring target.

7. The autonomous driving assistance device according to claim 1, further comprising:

a communication portion that receives information about another monitoring target, specified by another user of a different vehicle, from an external information center, wherein:

the additional avoidance processing portion sets, as the monitoring target, the another monitoring target that is specified by the another user of the different vehicle and is received by the communication portion.

8. The autonomous driving assistance device according to claim 1, further comprising:

a notification portion that notifies the user through a display or an audio when the additional hazard avoidance procedure is performed.

9. An autonomous driving assistance device comprising:

one or more processors; and a memory coupled to the one or more processors and storing program instructions that when executed by the one or more processors cause the one or more processors to at least:

perform a hazard prediction based on a predetermined hazard avoidance condition and perform a hazard avoidance procedure during an autonomous driving operation of a vehicle;

receive user-input information about a driving operation of the vehicle;

check area or object information input from the user-input information and determine the area or the object as a monitoring target;

track the monitoring target;

set at least one additional hazard avoidance procedure for the monitoring target, and perform the at least one additional hazard avoidance procedure in addition to the hazard avoidance procedure when the monitoring target approaches the vehicle, the at least one additional hazard avoidance procedure including a plurality of additional hazard avoidance procedures;

display on a display the at least one additional hazard avoidance procedure corresponding to the monitoring target input from the information input portion;

control the display to display the plurality of the additional hazard avoidance procedures;

receive a selection from a user; and perform one of the plurality of the additional hazard avoidance procedures when the plurality of the additional hazard avoidance procedures corresponds to the monitoring target from the user-input information.

10. An autonomous driving assistance device comprising:

a normal avoidance processing portion that performs a hazard prediction based on a predetermined hazard avoidance condition and performs a hazard avoidance procedure during an autonomous driving operation of a vehicle;

an information input portion that receives user-input information about a driving operation of the vehicle;

a determination portion that checks area or object information input from the information input portion and determines the area or the object as a monitoring target;

a track portion that tracks the monitoring target;

an additional avoidance processing portion that sets at least one additional hazard avoidance procedure for the monitoring target and performs the at least one additional hazard avoidance procedure in addition to the hazard avoidance procedure performed by the normal avoidance processing portion when the monitoring target tracked by the track portion approaches the vehicle; and a communication portion that receives information about another monitoring target, specified by another user of a different vehicle, from an external information center;

wherein the additional avoidance processing portion sets, as the monitoring target, the another monitoring target that is specified by the another user of the different vehicle and is received by the communication portion.

11. The autonomous driving assistance device according to claim 10, further comprising:
a display portion that displays the at least one additional hazard avoidance procedure performed by the additional avoidance processing portion corresponding to the monitoring target input from the information input portion.

12. The autonomous driving assistance device according to claim 11, wherein:
the at least one additional hazard avoidance procedure includes a plurality of additional hazard avoidance procedures; and
the additional avoidance processing portion controls the display portion to display the plurality of the additional hazard avoidance procedures, receives a selection from a user, and performs one of the plurality of the additional hazard avoidance procedures when the plurality of the additional hazard avoidance procedures corresponds to the monitoring target input from the information input portion.

13. The autonomous driving assistance device according to claim 10, wherein:
the track portion includes a camera to capture an image of the monitoring target; and
the track portion analyzes the image captured by the camera to track the monitoring target.

14. The autonomous driving assistance device according to claim 13, further comprising:
a map information provision portion that provides a current position of the vehicle as current position information in association with map information;
wherein the track portion tracks the monitoring target and focuses on the monitoring target by setting a capture range of the camera corresponding to the monitoring target based on the current position information provided by the map information provision portion.

15. The autonomous driving assistance device according to claim 14, wherein:
the additional avoidance processing portion provides a second accurate additional hazard avoidance procedure that is more accurate than the at least one additional hazard avoidance procedure based on information about the monitoring target with tracking and focusing on the monitoring target by the track portion.

16. The autonomous driving assistance device according to claim 10, wherein:
the display portion includes a touch panel that inputs the monitoring target by touching a screen of the touch panel.

17. The autonomous driving assistance device according to claim 10, further comprising:
a storage portion that stores, as learning information, the user-input information relating to the driving operation of the vehicle;
wherein the additional avoidance processing portion sets a previous monitoring target determined based on the learning information stored in the storage portion as the monitoring target.

18. The autonomous driving assistance device according to claim 10, further comprising:
a notification portion that notifies the user through a display or an audio when the additional hazard avoidance procedure is performed.

* * * * *